United States Patent [19]

Pronsato et al.

[11] Patent Number: 5,168,677
[45] Date of Patent: Dec. 8, 1992

[54] METHOD OF CONSTRUCTING FLAT BUILDING BLOCK MODULES FROM THE UNION OF TWO FRUSTUMS BY THEIR CONGRUENT BASES AND SLOT CONNECTORS COMPLEMENT FOR A VARIETY OF CONSTRUCTIVE OR AMUSING APPLICATIONS

[75] Inventors: Antonio C. Pronsato, Coral Spring, Fla.; Ernesto D. Gyurec, 3400 Ave. of the Arts, Apt. No. E-420, Costa Mesa, Calif. 92626

[73] Assignee: Ernesto Daniel Gyurec, Corona del Mar, Calif.

[21] Appl. No.: 436,665

[22] Filed: Nov. 15, 1989

[51] Int. Cl.$^5$ ............................................. E04B 1/32
[52] U.S. Cl. ................................. 52/81; 52/DIG. 10
[58] Field of Search ..................... 52/DIG. 10, 81; 446/114

[56] References Cited

U.S. PATENT DOCUMENTS

| | | | |
|---|---|---|---|
| 3,461,574 | 8/1969 | Larsen | 52/DIG. 10 |
| 3,564,758 | 2/1971 | Willis | 446/114 |
| 3,645,535 | 2/1972 | Randolph | 52/DIG. 10 |
| 3,698,124 | 10/1972 | Reitzel | 446/114 |
| 3,965,626 | 6/1976 | Johnson | 52/DIG. 10 |
| 3,974,600 | 8/1976 | Pearce | 52/DIG. 10 |
| 4,074,496 | 2/1978 | Fischer | 446/114 |
| 4,253,268 | 3/1981 | Mayer | 52/DIG. 10 |
| 4,323,245 | 4/1982 | Beaman | 52/DIG. 10 |
| 4,496,155 | 1/1985 | Goldfarb | 52/DIG. 10 |
| 4,593,908 | 6/1986 | Ibrahim | 52/DIG. 10 |
| 4,682,450 | 7/1987 | Diamond | 52/DIG. 10 |
| 4,723,382 | 2/1888 | Lalvani | 52/DIG. 10 |
| 4,789,370 | 12/1988 | Ellefson | 446/114 |

OTHER PUBLICATIONS

Playplax publication received in PTO Mar. 14, 1968.

Primary Examiner—David A. Scherbel
Assistant Examiner—Creighton Smith
Attorney, Agent, or Firm—Daniel L. Dawes

[57] ABSTRACT

A method to guide the creation of flat modular building block units to be interconnected with others of like shape by means of fasteners and magnetically, the modules are created by the union of any two frustums by a congruent larger base, a series of holes truncations and roundings made them fit in a variety of constructive and amusing applications, also complementing the invention is a built-in slot connector for connecting two flat members.

15 Claims, 21 Drawing Sheets

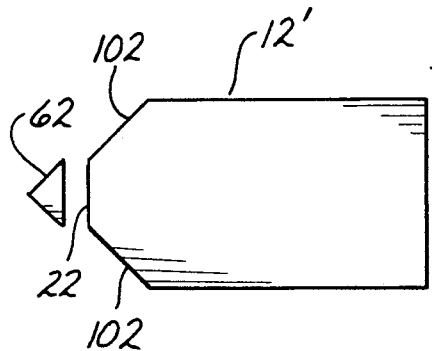
"A" CROSS SECTION
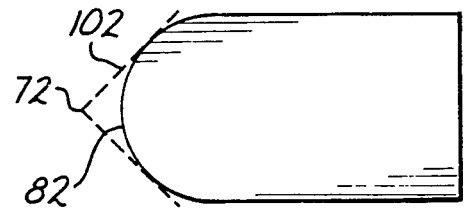
"B" CROSS SECTION
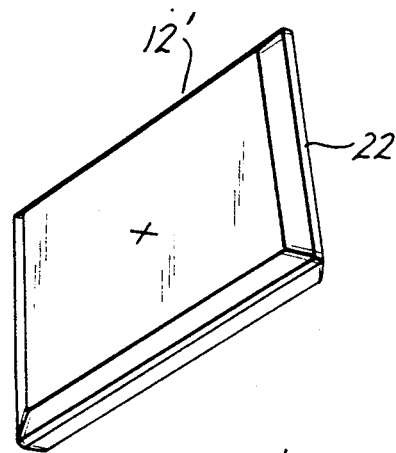
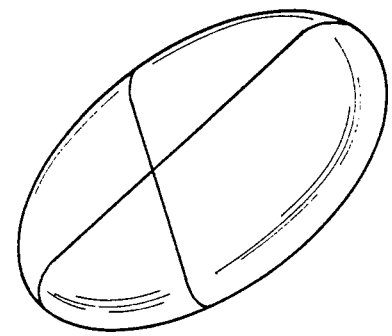
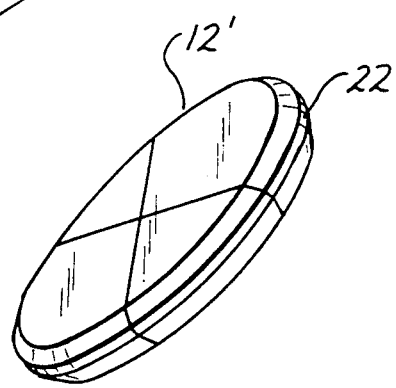
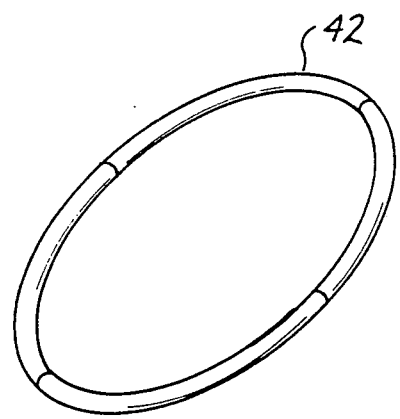
Fig. 11

"A" CONNECTOR

"B" CONNECTOR

MNEMONIC CHART

| POLYHEDRONS | CUBE 1 | TETRA 2 | OCTA 3 | RHOMBIC 4 | CUBOCTA 5 | POLAR 6 |
|---|---|---|---|---|---|---|
| FACES | FA1 | FA2-3 | FA2-3 | FA4 | FA1 / FA2-3 | FA6 |
| VERTEXES | VE1 | VE2 | VE3 | VE4 | VE5 | VE6 |
| CENTRAL POINTS | CP1 | CP2 | CP3 | CP4 | CP5 | CP6 |
| PYRAMIDS | PY1 | PY2 | PY3 | PY4 | PY5S / PY5T | PY6 |
| FRUSTUMS | FR1 | FR2 | FR3 | FR4 | FR5S / FR5T | FR6 |
| TOP PORTIONS | TP1 | TP2 | TP3 | TP4 | TP5S / TP5T | TP6 |
| DIEDRAL ANGLES | AN1 | AN2 | AN3 | AN4 | AN5 | AN6 |
| DISTINCTIVE ANGLES | DA1 | DA2-3 / DA5T | DA2-3 / DA5S | DA4 | DA5S / DA5T | DA6 |
| PERIMETRICAL EDGES | PE1 | PE2-3 | PE2-3 | PE4 | PE5S / PE5T | PE6 |
| PERIMETRICAL FACES | PF1 | PF2 | PF3 | PF4 | PF5S / PF5T | PF6 |
| MODULES | M1 | M2-3 | M2-3 | M4 | M5S / M5T | M6 |
| PERIMETRICAL SIDES | PS1 | PS2-3 | PS2-3 | PS4 | PS5S / PS5T | PS6 |
| SKELETAL MODULES | SM1 | SM2-3 | SM2-3 | SM4 | SM5S / SM5T | SM6 |

Fig. 21

METHOD OF CONSTRUCTING FLAT BUILDING BLOCK MODULES FROM THE UNION OF TWO FRUSTUMS BY THEIR CONGRUENT BASES AND SLOT CONNECTORS COMPLEMENT FOR A VARIETY OF CONSTRUCTIVE OR AMUSING APPLICATIONS

BACKGROUND OF THE INVENTION

1. Field of the Invention

This invention broadly relates to modular building construction, and specifically to a method to make dihedrally connected building blocks and a built-in slot connector to erect or to make the structure of buildings, billboards, towers, roads, runways, dams, bridges, shore and offshore structures, furniture and their respective scale models for testing and design.

These scale model building blocks modules also can be profitable if used as teacher's aids and toys.

2. Prior Art

The construction of buildings by a plurality of similar simple polyhedral members, generally rectangular prisms, is practice followed since ancient times for two main reasons. The obvious advantage is the low cost mass production of those members as is explained in Bardot's U.S. Pat. No. 3,777,359, the less obvious advantage is the low cost construction of scale models for testing and design. There are three main disadvantages of the simple brick:

They are too massive, to heavy.
They are assembled only into prismatic structures.
They are weakly connected.
Heretofore those disadvantages had been alleviated, generally only demeaning the main advantages.
The solution of the massiveness problem by making holes in the members creates, once assembled, conduits which could be another advantage; however, those conduits are by means of simple molding not connected, they are parallel.

The second disadvantage have been partially overcome by making complex polyhedrons, see Hervath, U.S. Pat. No. 3,783,571. However, this second problem is not widely seen as such. Most designers are still exploring the mysteries of the cube structure; NASA space station structure, for example, having an expensive and very sophisticated system designed to be assembled into forty six different polyhedral arrangements, it's timidly cubical. The third problem, the weakness of the connection, perhaps the most elusive, had been attacked economically by perfecting a tongue and groove holding and locking systems, see Silvius' U.S. Pat. No. 3,687,500, for a dihedral slot connection.

The building blocks of the art known as space structures are a different case. They are vertically connected frames (see Pearce's U.S. Pat. No. 3,600,825). These structures dispel the three problems and the two main advantages entirely, generally adding problems of their own, such as low tolerance edge members length.

Space structures may be visualized as a plurality of assemble polyhedral bricks from which everything had been removed except a small portion along the edges; those edge-members are connected at the vertexes or corners of the polyhedrons.

Space structures, generally, have two main component part, a member and a connector. The member is an elongated prism or a tube whose cross section center is the edge of the polyhedrons and the connector is usually ball shaped, at a vertex of the polyhedrons.

The space structure member in principle, can be easily mass produced by extrusion of simple molding, the multiple connector the other hand has eluded and heretofore inexpensive solutions. For this problem classical space structures, regardless of their high strength to weight ratio and the immense variety of shapes they can form, had been relegated in architectures usually to trusses or to secondary functions such as canopies. An in the construction industry, space structures had been shadowed by the simple-face connected-square-prismatic building blocks.

Another problem associated with the ingenious solution invented since Bell's U.S. Pat. No. 4,686,800.

OBJECTS OF THE INVENTION

It is a principal object of the present invention to unite advantages of the bricks with those of the space structures: low cost production (extrusion, simple molding), low cost test scale modeling, high strength over weight ratio, maximum variety of polyhedral arrangement and low cost structural design and erection labor.

SUMMARY OF THE INVENTION

These and other objects are derived from a new method for creating modular building blocks units together with a new dihedral slot connector for erecting geometrical structures.

The design engineer interested in geometrical structures will find the study of a method applicable to any polyhedron. That the individual description of a bunch of building blocks made with the said method.

The method of present invention had evolved along two branches, pyramidal and conical. But, because cones are a class of pyramids, to clarify and amplify the concept, the method will be presented in a single description. The method of manufacture is hypothetical steps as a guide for the design of modular building block units—modules, for short.

Solid Pyramidal Modules (See FIGS. 1 to 6)

First, we choose a couple of concave face congruent polyhedrons, preferably space-fillers. We shall call them original polyhedrons. Second, by connecting any internal point and the vertexes, we divide the original polyhedrons into as may pyramids the polyhedrons have faces. We create pyramids having a polygonal base, which was face of the original polyhedrons.

Third, we make frustums of the said pyramids; we remove the top parts of the pyramids in a plane between their base and the apex. Fourth, gluing the frustums by their congruent larger bases, we created a solid pyramidal module. The core of the new method is the creation of a building block by the bonding of the two frustums by their congruent bases. Connecting the vertexes with the center of the volume, the original cube generates six pyramids of square base. The original tetrahedron generates four pyramids of triangular base. The original octahedron generates eight pyramids of triangular base. The original cuboctahedron creates six square pyramids and eight triangular pyramids. The original tetragonal octahedron generates eight isosceles pyramids. The frustums of those pyramids are half of the solid pyramidal modules.

Therefore, solid pyramidal modules are frustums (of pyramids having the original polyhedron polygonal face for base and the original polyhedron center for apex)

glued by their bases to other identical or different frustums with congruent bases.

Skeletal Pyramidal Modules

A hole or holes through the module's bases provide a means to make and erected structure.

We shall call the solid modules from which a central portion has been removed, skeletal pyramidal modules, see FIG. 10.

Distinctive Angle

We shall call the angle (sum of two polyhedrons' dihedrals,) drawn by a cross section perpendicular to the side of the modules, (see FIG. 6 A2 B2 C2 D2 E2 for modules' cross sections) the distinctive angle.

The other preferred type of module to be made with the present invention method (see FIG. 7 in the cube example) is constructed by two conical frustums glued by their bases. The conical frustums are frustums of cones having the original polyhedron center point for apex and have a circle for base. These circle are inscribed, tangent at each side of the polygonal face of the original polyhedron and tangent also the neighbor circles.

It is imperative in this kind of module to mark it where the circle is touching the polygon side because these are the places where a module will be connected, according to the present method, to other modules (see FIG. 6 A3 B3 C3 D3 E3 for a top view of the conical module, and FIG. 9 for a perspective view of an assembled polyhedron). In most conical modules we don't know without marks, where the sides are. The conical module is limited by the fact that a circle can be inscribed in a limited number of polygons. However limited, conical modules may prove useful by its simpler design.

Skeletal Modules

By means of a hole or holes through the bases or the extensive removal through the plane central portion, the designer may achieve lighter modules, skeletal modules of the two genuses pyramidal an conical, (see FIG. 10) which allows for the separate construction of the module's sides by industrial processes other than molding, such as extrusion or metal sheet bending for the making of holes through the sides to use a bolt like fastener to hold the modules to others of like shape.

Two Cross Sections

Solid and skeletal modules have, within the present method, two preferred embodiments represented by cross section that we shall call "A" and "B" (see FIG. 11). "A" is a truncation of the distinctive angle. The "B" cross section mainly apply to the conical modules. It is a semicircle or, in the skeletal configuration, could be a circle.

The conical modules are assembled according to the present method by means of wrapping fastener, through holes in the member or magnetically.

Single Description (See FIGS. 19 and 20)

Cones have been studied and defined as pyramids with an infinite sided base, therefor both genuses of the method can be reduced to one, and, because the core of the method, the union of the frustums by their congruent base, has not been previously explored, we think we have the right and duty to expose the following simpler and wider description the method:

1. The union of two frustums by their congruent base.
2. The removal of a central portion through the plane section of the frustum.
3. The making of holes through the peripheral side of the frustum.
4. The truncation of the right edge of the frustum.
5. The rounding of the right side of the frustum.
6. The magnetization of the frustum.
7. The magnetization of the module.

Built-in Dihedral Slot connectors

Until this point, the present invention modules have the need of a fastener, adhesive or magnetic, to be attached, connected to be assembled, or erected structurally. Now, see FIG. 13, there is a fundamental leap that allows the modules to connect on to another intersecting perpendicularly as dows the type of connector developed first by Beck's U.S. Pat. No. 2,894,935.

The built-in dihedral slot connectors (slot connectors, for short are not part of the method, but is the preferred embodiment to be built into the modules created by the present invention.

"A" & "B" Connectors

The present invention slot connectors are of two type, one more suited for the "A" cross section (see FIG. 16), we shall call it "A" connector, the other, which is round (see FIG. 17), we shall call it "B" connector. The "A" connector improvement over previous slot-connectors designs (U.S. Pat. Nos. 3,177,611, 3,698,124, 3,940,100 etc.) consists mainly in augmenting the surface of contact between connectors, and with "B" connectors, the improvement comprise the easily radially deformable shape of the cylinder when pressed on a surface line parallel axis to its connectors of present invention are preferably located where the conical modules are marked or at the middle of the sides in the pyramidal modules. The "B" connector built at the marks of a conical skeletal "B" cross section module is a configuration easily adaptable to wide different processes such as inflatable toy modules and building construction iron modules.

BRIEF DESCRIPTION OF THE DRAWINGS

FIG. 11 shows two cross sections, "A" and "B", and a perspective view of four modules, one pyramidal and one conical with "A" cross section, and two conical, one solid and one skeletal with "B" cross section.

FIG. 21 is a chart of the reference symbols used in FIGS. 1-20.

DETAILED DESCRIPTION OF THE PREFERRED EMBODIMENTS

Figure 1:
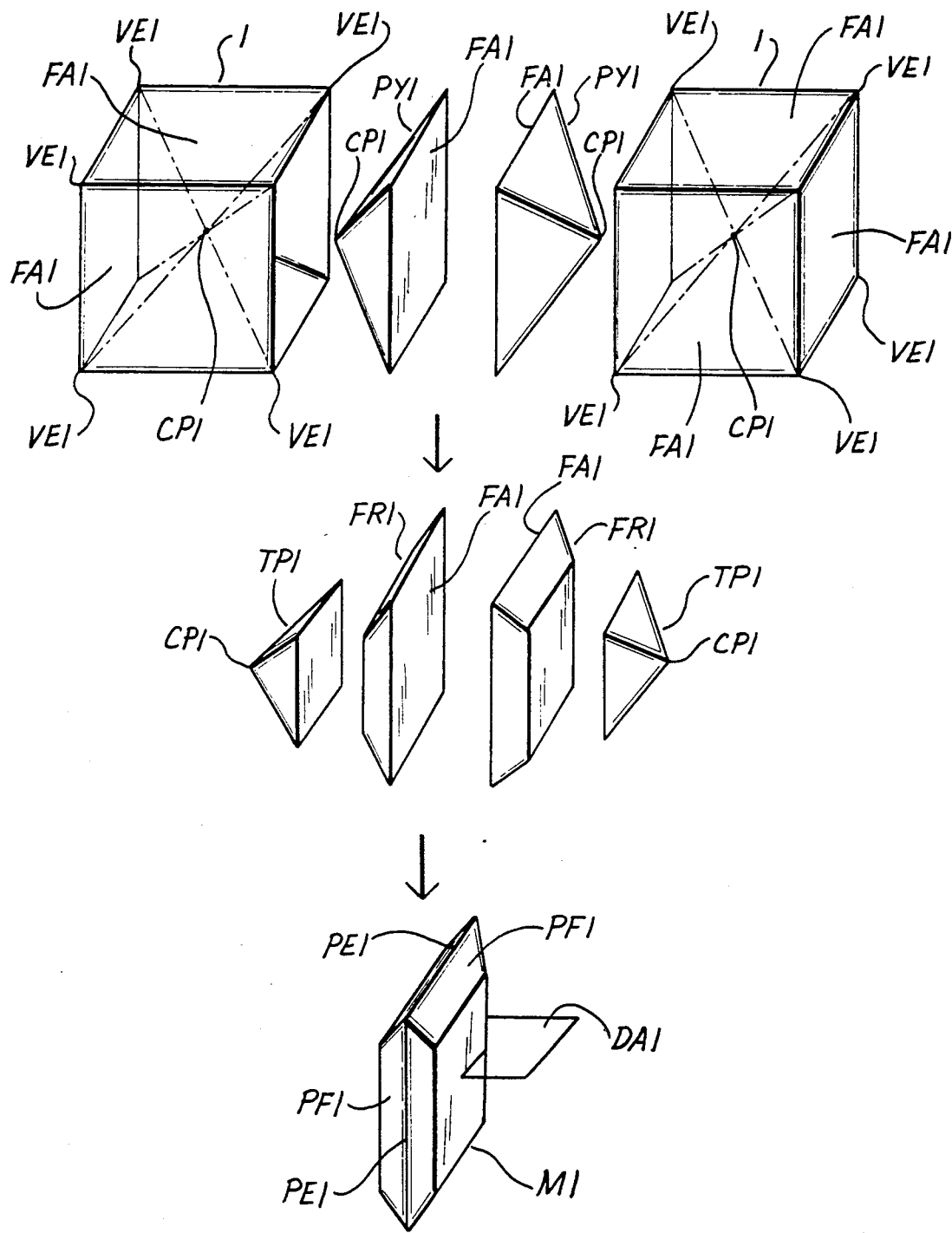
FIGS. 1 to 5 show the perspective views of three successive hypothetical manufacturing stages, the extraction of pyramids form six polyhedrons, the making of frustums form the said pyramids and the creation of solid modules from the said frustums.
Figure 2:
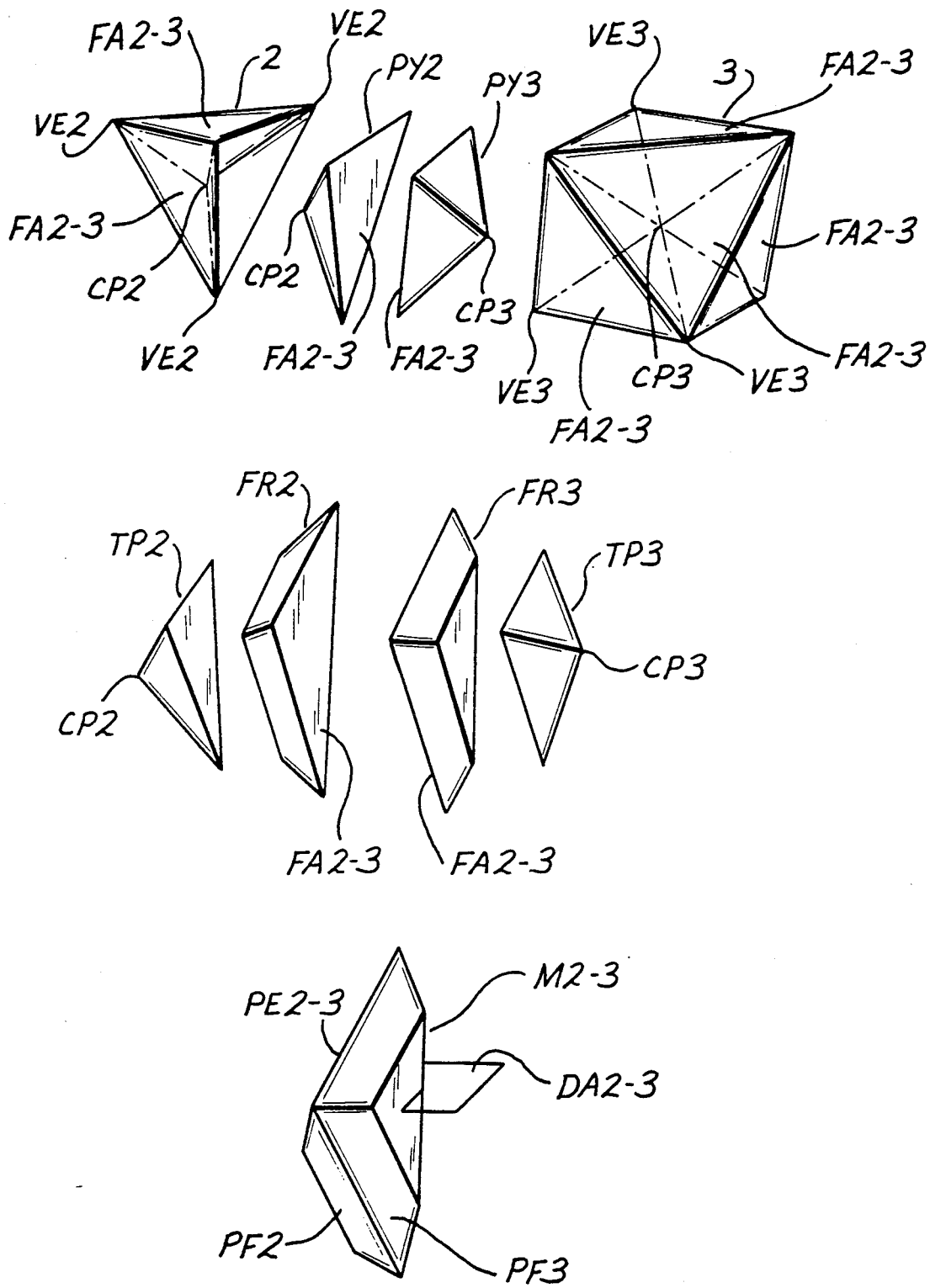
Figure 3:
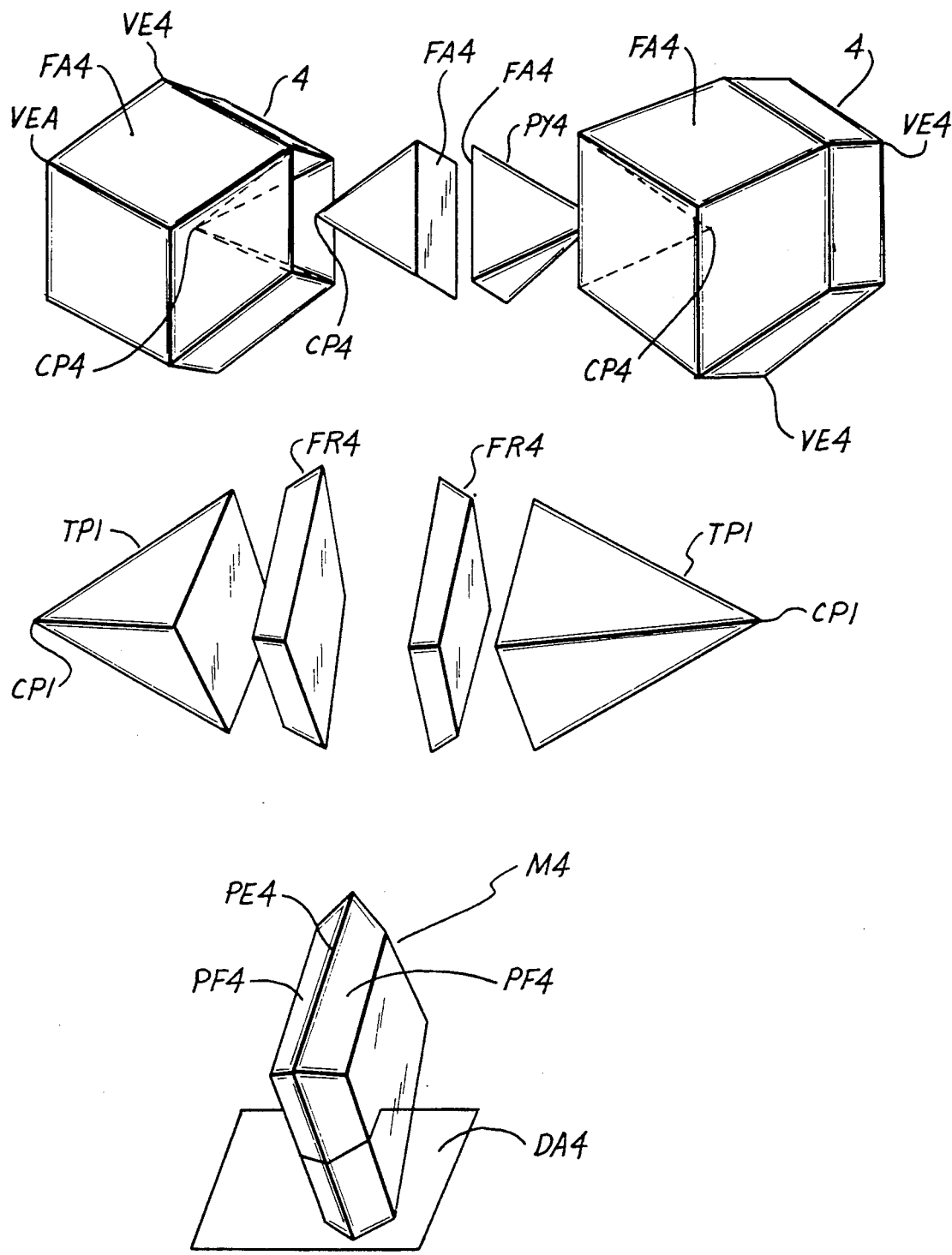
Figure 4:
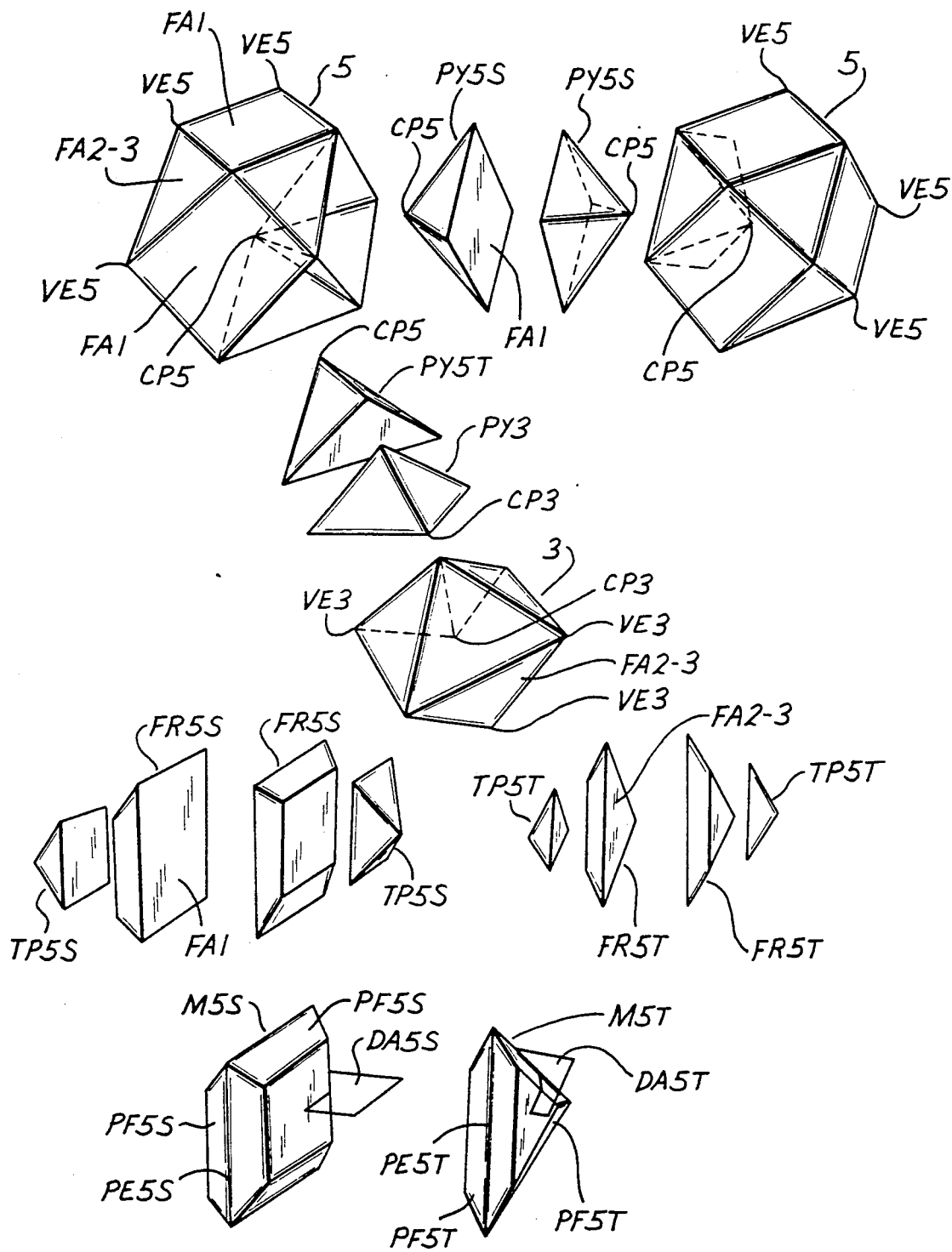
Figure 5:
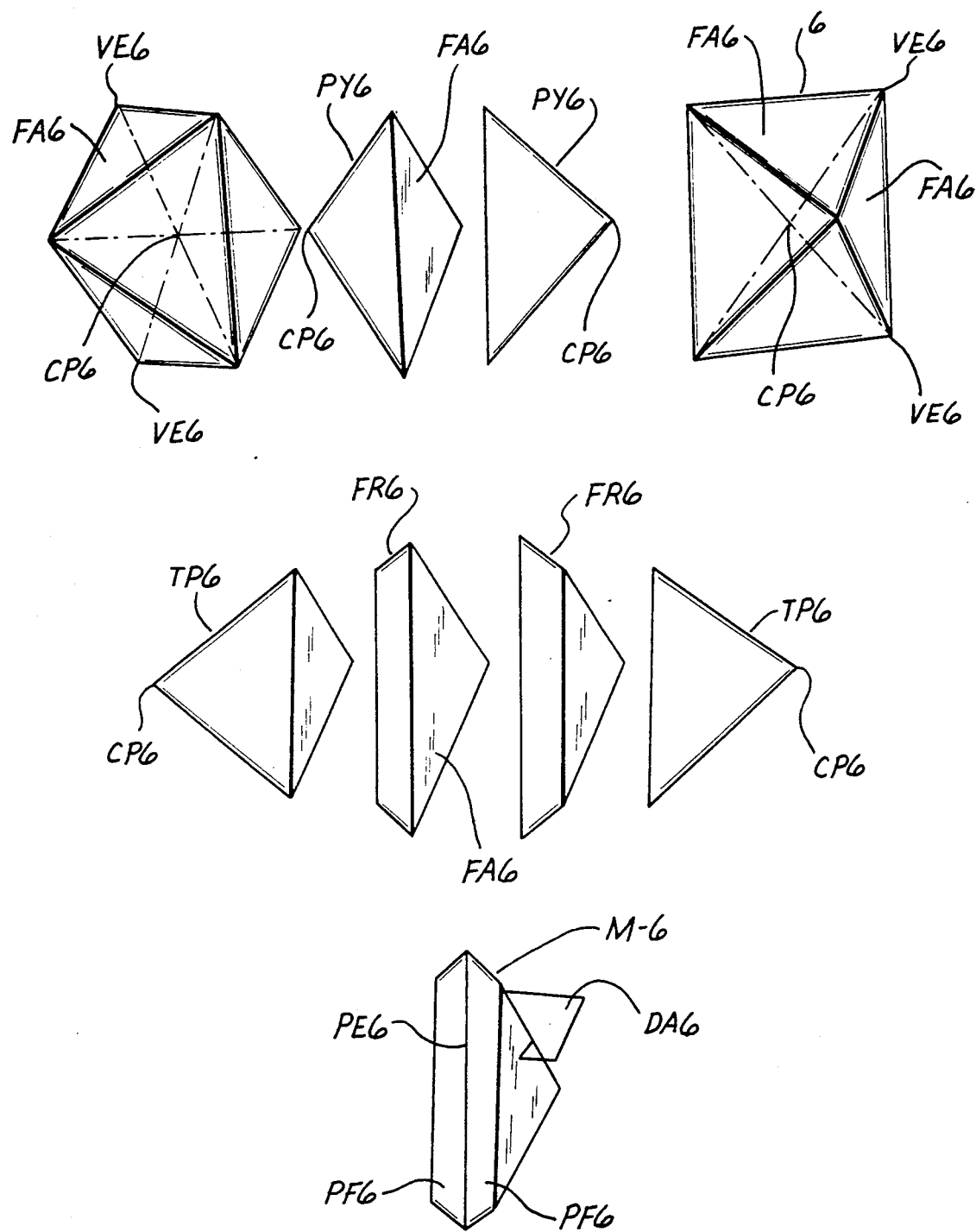

The present invention has two aspects. One is a module defined by a hypothetical method to make building block modules (modules for short); the other is an apparatus, a built-in slot connector for the perpendicular connection of two flat members. Because the modules made with this method are flat members, both parts conveniently complement each other.

THE HYPOTHETICAL METHOD OF MANUFACTURED USED TO DEFINE THE STRUCTURE OF THE MODULES

To ease the reading we created mnemonic chart. See FIG. 21. The method may be described as along two genuses, Pyramidal and Conical. Both genuses comprise steps t create module construction units which may be interconnected with others of like shape by means of a fastener, magnetically or connected by means of others modules of like shape to erect a hollow polyhedral structure after being provided by an integral connector.

The method may also be described along one single line because cones are a class of pyramids. This freer description may help to produce modules that, when connected to others of like shape, create results beyond polyhedral structures.

We decide to expose the method in its tow forms in the belief that a double description could clarify subtle relationships between the two types of structure.

Pyramidal modules

The preferred embodiment of the present invention will now be described in connection with FIGS. 1 to 5. The first step is to choose a couple of polyhedrons (Original polyhedrons). These may be two equal polyhedrons such as cubes 1, (FIG. 1.) rhombic dodecahdrons 4 (FIG. 3) or tetragonal octahedrons 6 (FIG. 6.); or they may be two different faces as a cuboctahedron 5 (FIG. 4) and a octahedron 3; (FIG. 2, 4,) or they may be a combination involving three or four different polyhedrons (four different polyhedrons is the limit for regular and irregular space filling systems).

In any case, we first choose two of them with congruent faces—common faces—such as the square FA1 of the cube 1 or the regular triangle FA2-3 in the eh tetrahedron 2 structure.

We will begin by choosing polyhedrons that form the more simple structures, triangular and rectangular prisms. We may continue with regular space fillers, then semiregular space fillers, and finally get to the most irregular polyhedrons such as the wonderful Buckminster Fuller's "Quanta Modules". After choosing the original polyhedrons, we have to select a point inside them, not a point on the surface. If this point is at the center, equidistant to all faces, as in all our examples, the modules will be simpler; experimental or toy modules may require and eccentric point. The center point is usually found, in regular and semiregular polyhedrons, at eh intersection of lines connecting the vertexes, connecting the centers of the faces, or connecting the vertices with the centers of the faces.

Referring to FIGS. 1 to 5 the second step of the present new method involves the mental sectioning of the original polyhedrons 1, 2, 3, 4, 5, 6, into pyramids PY1, PY2, PY3, PY5S, PY5T, PY6 defined by segments between the central points CP1, CP2, CP3, CP4, CP5, CP6, and their respective vertices VE1, VE2, VE3, VE4, VE5, VE6. The step may also be expressed as the creation of pyramids, PY1, PY2, PY3, PY4, PY5, PY5S, PY5T, PY6 having them the central points CP1, CP2, CP3, CP4, CP5, CP6 of the original polyhedrons 1 2, 3 4, 5, 6 for apex and the original polyhedrons faces FA1, FA2-, FA4, FA1-FA2-3 FA6, for base.

From the cube 1, the tetrahedron 2, the octrahedron 3, the rhombic dodecahedron 4 and the tetragonal octahedron 6 is extracted one type of pyramid respectively but form the cuboctahedron 5 are extracted tow types of pyramids, one square, PY5S, and one triangular, PY5T. Three different pyramids from one polyhedron is the limiting case for regular or irregular space filler polyhedrons.

The third step is the making of frustums FR1, FR2, FR3, FR4, FR5S, FR5T, FR6 for the extracted pyramids PY1, PY2, PY3, PY4, PY5S, PY5T, PY6. This is accomplished by removing the top portion TP1, TP2, TP3, TP4, TP5S, TP5T, TP6 after a plane sectioning between the apex CP1, CP2, CP3, CP4, CP5, CP6, and the base FA1, FA2-3, FA4 FA1-FA2-3 FA6 of the said pyramids PY1, PY2, PY3, PY4, PY5S, PY5T, PY6. Because the thickness of the module is produced by this sectioning, the designer should consider it as significant design variable. The sectioning may be parallel to the base, as in our examples, creating regular trapezoidal perimetrical faces PF1, PF2, PF3, PF4, PF5S, PF6.

The fourth step, the creation of the modules, is the heart of the method. Mentally joining one original polyhedron's frustum FR1, FR2, FR3, FR4, FR5S, FR5T, FR6 by their congruent base FA1, FA2-3, FA4, FA6, forms a third body; the modules M1, M2-3 M4, M5S, M5T, M6. As a result of the union of the frustums, the common base's polygon FA1. FA2-3, FA5, FA6 (in all it's combinations) form the peripheral edges PE1, PE2-3, PE4, PE5S, PE5T, PE6. The cube 1 system's module M1 is made by the union of two equal frustums FR1. The tetrahedron 2 octahedron 3 system's module M2-3 is made by the union of two different frustums FR2 and FR3. The cuboctahedron 5 octahedron 3 system have one square module M5S made from the union of two equal frustums FR5S and triangular module M5T made from the union of two tuu frustums FR3 and FR5T. Th rhombic dodecahedron 4 system's module M4 is made by the union of two equal frustums FR4. The tetragonal octahedron 6 module M6 is made by the union of two equal frustums Fr6.

An interesting column, the Buckminster Fuller's "Tetrahelix", is made with a module formed by two tetrahedron's frustums FR2. Summing up, original polyhedrons 1, 2, 3, 4, 5, 6 are divided into two pyramids PY1, PY2, PY3, PY4, PY5S, PY5T, PY6 form which are removed top portions TP1, TP2, TP3, TP4, TP5S, TP5T, TP6 forming frustums FA1, FA2-3, FA4, FA6, for examples of solid pyrmidal modules M1, M2-3, M4, M5S, M5T, M6 with their distinctive angles DA1, DA2-3, DA4, DA5S DA5T, DA6 along their peripheral faceted side PF1, PF2, PF3, PF4, PF5, PF5T, PF65 and their peripheral edges PE1, PE2-3, PE4, PE5S, PE5T, PE6. The fifth step is described in connection with FIG. 11. It compares the truncation of the peripheral polygonal edge 6 of the module 1 creating a peripheral side 2 between the peripheral faces 10, that is one wall (in a built structure) of a conduit along the edges of the polyhedron.

We shall call this truncation and "A" cross section; this truncation is useful also in molding and to avoid chipping.

The following steps are described in connection with FIG. 10. The sixth step creates another conduit in the build structure, this time bigger and perpendicular to the face of the original polyhedron. It makes skeletal modules SM1 and SM2-3 by the removal through the plane of the modules of a portion small 11 or large 11, but never reaching or modifying the perimentrical faces PF1 PF2 or PF3 and their distinctive angle. This step is crucial; the designer creates with it conduits not only to get access into the structure but also as holder of tubes or spheres, s in Haug's U.S. Pat. No. 3,940,100.

The seventh step is the making of holes 8 through the peripheral faceted sides PF2, and PF3 of the module M2-3 for the use of a rivet or a bolt-nut 12 fastener to hold the module to others of like shape.

Conical modules

There is another type of modules visualized by similar method. They are modules made joining two conical frustums by their equal circular bases. They are, as the pyramidal modules, aimed to be assembled into hollow polyhedral structures.

The first is to choose two polyhedrons. They may be equal or different but they must pass three conditions: 1) their faces must be congruent, 2) have at least bilateral symmetry (this condition leaves out entire families of scalene tetrahedron spacefillers), and 3) a point on the face must be equidistant to the sides—a circle inscribed in them must touch each one of the sides (this condition leaves out, for example, elongated rectangles and truncated triangles).

Figure 7:
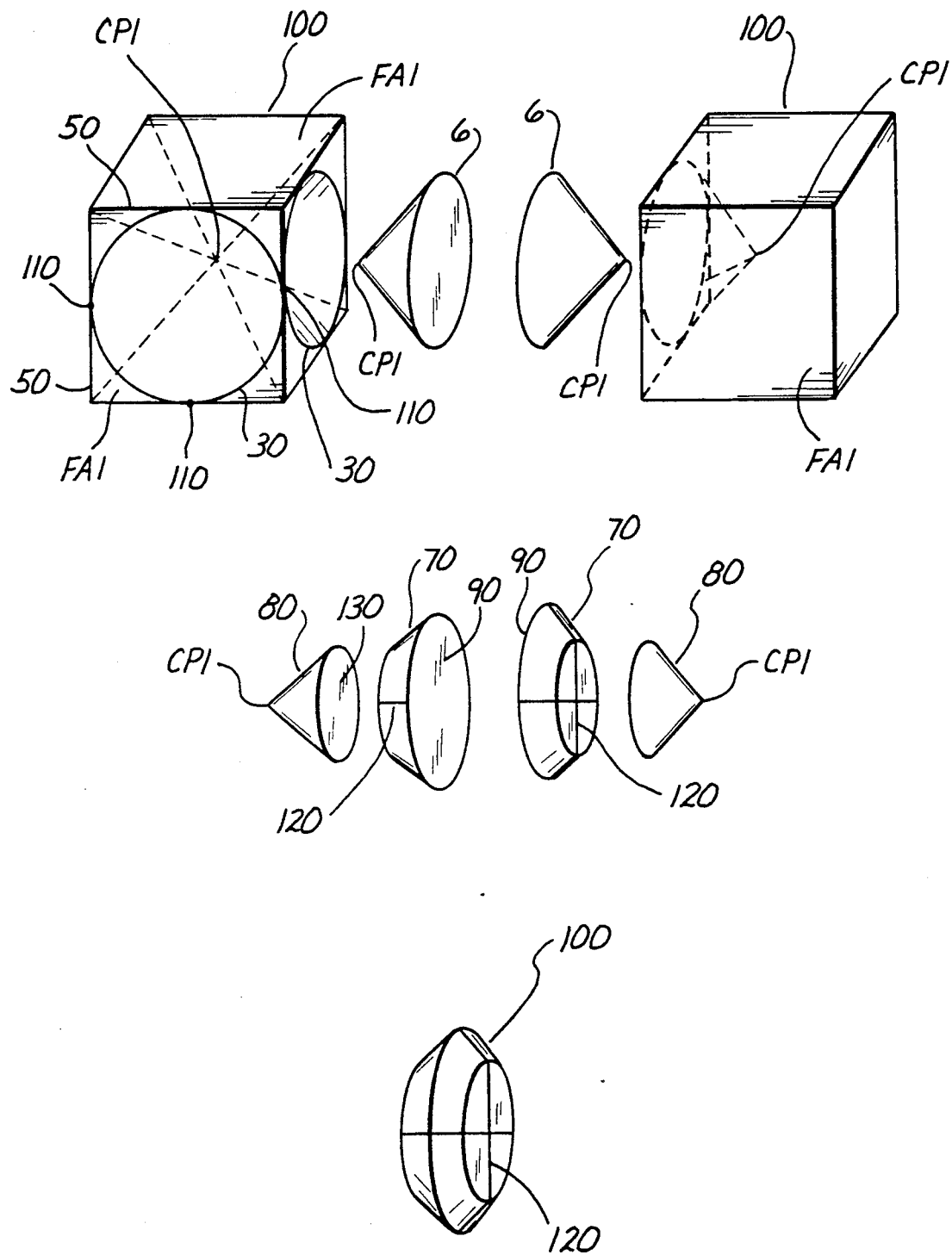
FIG. 7 shows the perspective views of three successive hypothetical extraction of cones from two cubes, the making of frustums from the said cones and the creation of a solid module form the said frustums.

We may choose any of the polyhedrons of FIGS. 1 to 5, but for the present new method example we'll refer to cubes, s shown in FIG. 7.

The second step is to choose a volume point or the central volume point CP1 in each of the polyhedrons 1 to show the place where a module must be attached to others of like shape to be erected.

The next two steps, eight and ninth, are described in relation with FIG. 11, they are to truncate the peripheral edge 62, to remove the tip of the distinctive angle 72, and to make a single peripheral side 21 between the sides 102, useful in molding and to avoid chipping.

Figure 10:
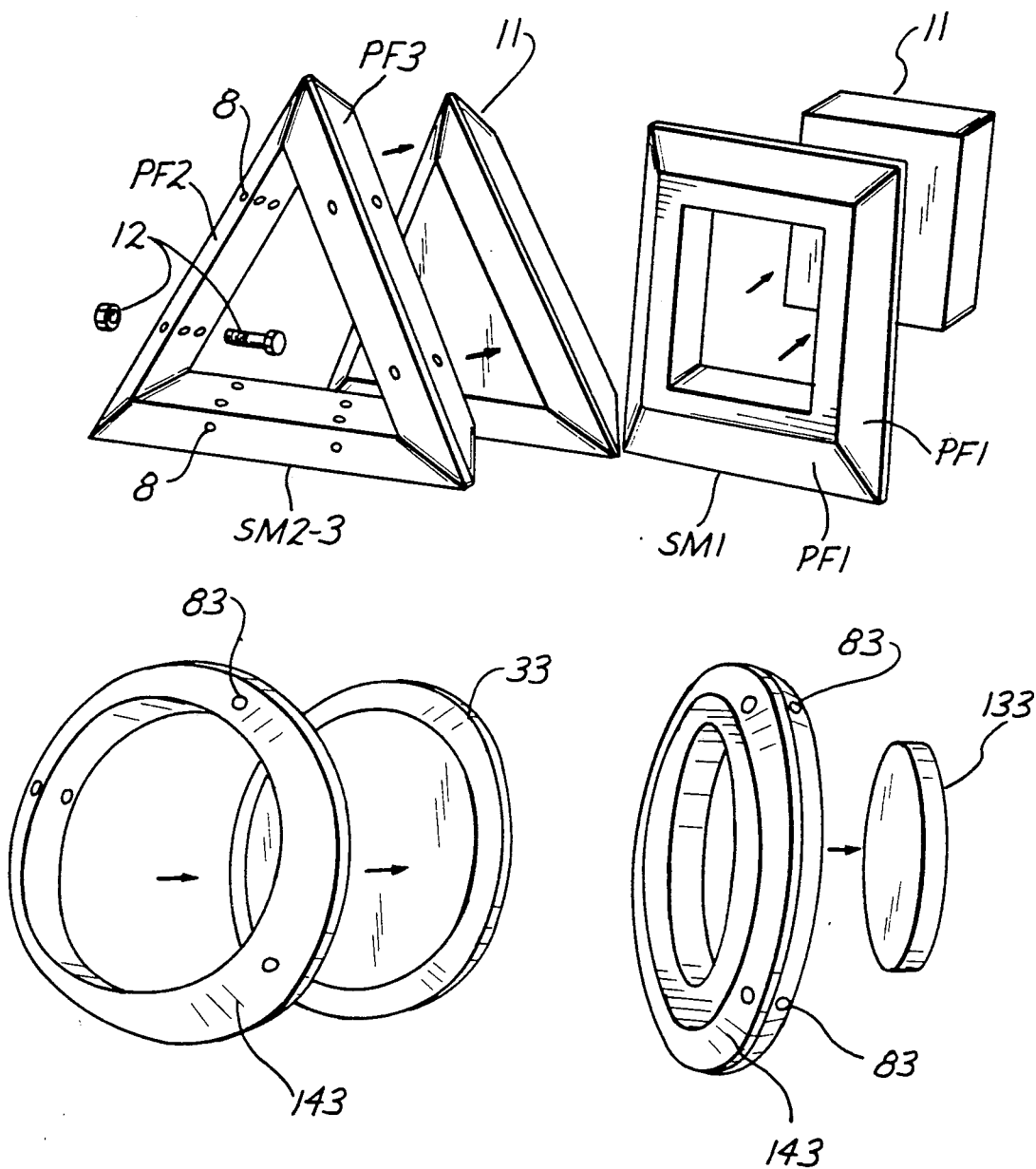
FIG. 10 shows a perspective view of the making of pyramidal and conical skeletal modules.

The last steps are described in relation with FIG. 10. The tenth step is to remove through the module's plane a central portion, either small 133 or large 33, but never reaching or modifying the peripheral sides 14. As result of this step, we obtain skeletal modules.

The eleventh step is to make holes 83 through the perimetrical sides 143 where indicted by the marks of step number seven to attach eh modules by means of a fastener, according to the present invention. There is a further simplifying preferred embodiment of the present new method for conical modules; it will be described in relation to FIG. 11.

Figure 12:
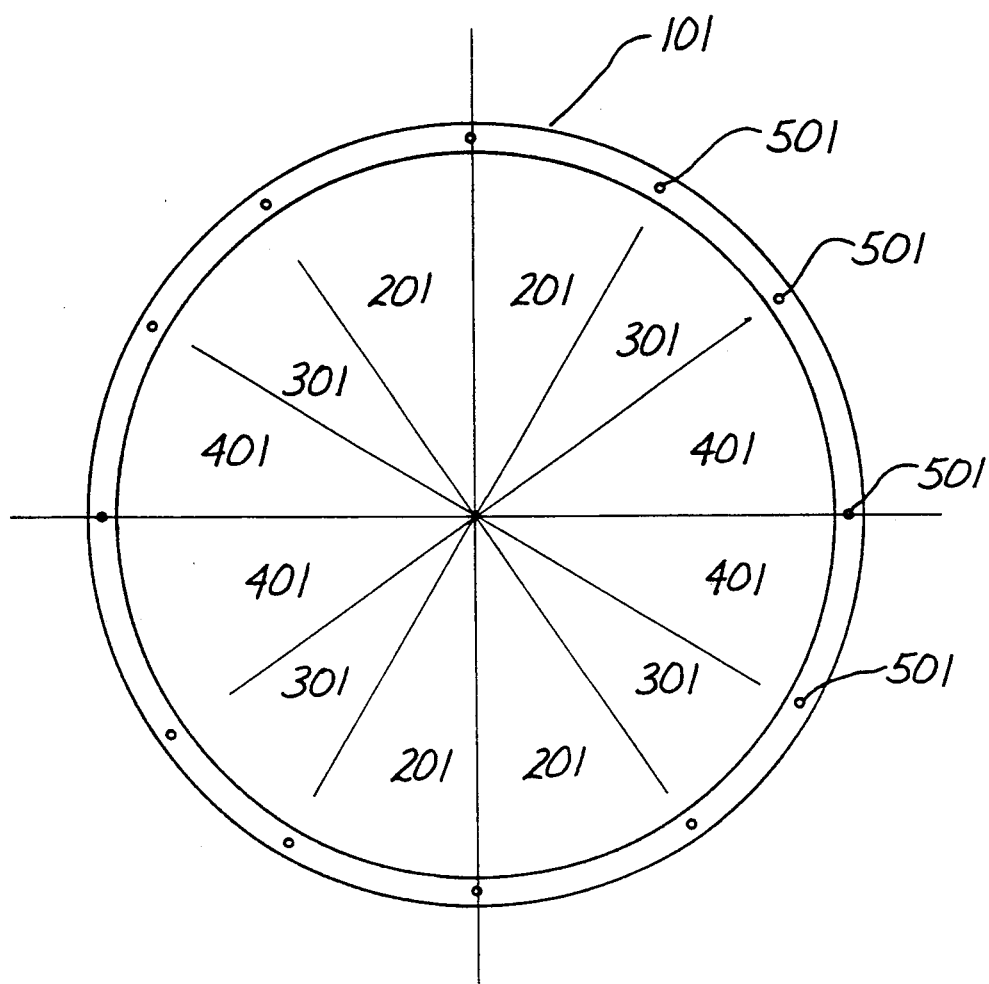
FIG. 12 shows a top view of a "universal" conical, skeletal module.

The twelfth step consists in the rounding of the perimetrical edge 72, represented in a module's cross section a sa semicircle 82 tangent to the perimetrical faces 102; this is the "B" cross section. This step together with the tenth makes a module form an expensive ring 4; the module 101 top view depicted in FIG. 12, holed between angles of thirty degree 201, twenty five degree 301 and thirty five degree 401 disposed in ninety degree specular arrangement may be assembled, according to the invention, into five space filling structures by means of a wire fastener and may be used in concrete reinforcing, not only as the ultimate reinforced of the concrete, but also as scaffolding and holder of the forms.

The modules are somewhat flat rigid elements; their embodiments are determined by two type of sections: those of the plane and those of the thickness or cross section.

The plane sections of a module results in polygons; the middle plane section is the face of the original polyhedron.

The cross section (perpendicular to the sides towards the center) has an angle that is the sum of two original polyhedron bisected dihedrals.

Figure 6:
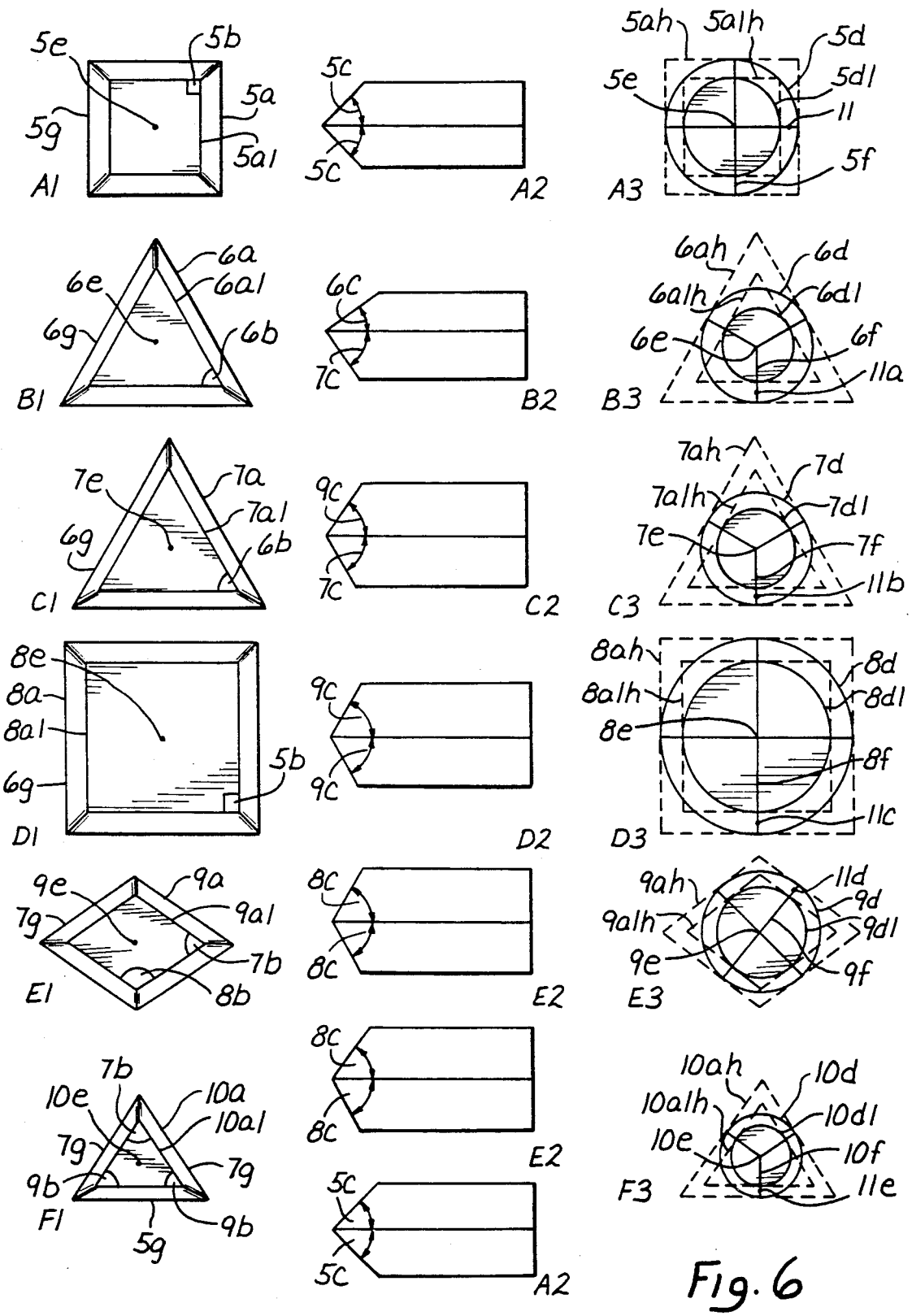
FIG. 6 shows a chart of the top views and common cross sections of the ten solid modules from FIGS. 1 to 5 and 7, both pyramidal and conical genuses.

As a guide for the drafting of modules the designer of advance modules may create, for the manufacture of modules, a chart of top views (face sections) and cross sections of the modules such as the one depicted in FIG. 6, which shows the six modules from FIG. 1 to FIG. 5 top views A1, A3, B1, B3, C1, C3, D1, D3, E1, E3, F1, F3, (they represent both faces of the modules, therefore no hidden lines are shown) and cross section A2, B2, C2, D2, E2 (each one represents all the polygons sides, with the exception, in these examples, of the tetragonal octahedron 6 where two cross sections A2, E2 represent three sides 7g, 7g, 5g. The cross sections are the same for both pyramidal and conical modules; they have two acute angles 5c, 6c, 7c, 8c, 9c each one half the size of the original polyhedron's dihedral(s), and the sum of those e angles form distinctive square or triangular modules by these angles.

Each top view shows two polygonal perimeters, one external (face of the original polyhedrons) 5a, 5d, 6a, 6d, 7a, 7d, 8a, 8d, 9a, 9d, 10a, 10d) and one internal (which is not critical) 5a1, 5d1, 6a1, 6d1, 7a1, 7d1, 8a1, 8d1, 9a1, 9d1, 10a1, 10d1. Both perimeters have the same number of sides and the same angles between sides. The sides and angles of the conical module top views are hypothetical and represented by a broken line 5ah, 5a1h, 6ah, 7ah, 7a1h, 8ah, 8a1h, 9ah, 9a1h, 10ah, 10a1h. At some convenient point on the lines form the tangential points 5f, 6f, 7f, 8f, 9f, 10f to the plane center 5e, 6e, 7e, 8e, 9e, 10e, a mark or hole 11, 11a, 11, 11c, 11d, 11e, is made to indicate where to attach one module to another according to the present invention method.

The following list shows approximate proportional lengths and angles form FIG. 6. Angles are mandatory but some lengths are given to conform with volume standards given by Peter Pearce's "Structure n nature is a strategy for design".

5g = The unity (u)
6g = (u) times square root of 2
7g = (u) times square root of 3 divided by 2
5b = 90 degree angle
6b = 60 degree angle
7b = 70 degree angle
8b = 110 degree angle
5c = 45 degree angle
6c = 35 degree angle
9b = 55 degree angle
7c = 62.5 degree angle.

MODULES SINGLE DESCRIPTION

The present invention method will now be described to give more freedom to the designer referring to frustums of unspecified amount of sides and dihedral angles-unspecified in the same e sense we may call unspecified the amount of spokes a wheel could have from the hub to the rim and in the mathematical sense being eh infinite sided polyhedron a circle- to frustums not necessarily related to predetermined polyhedrons; the method of the present invention works with any frustum, with any pair of frustums of congruent base. Removals, holes, truncations and roundings will be done in the frustum instead of being performed in the constructed module. This wider method may help to create some complexity but also unexpected wider and beauty.

Although frustums always have one base larger than the other, we will name them for further clarity.

Figure 18:
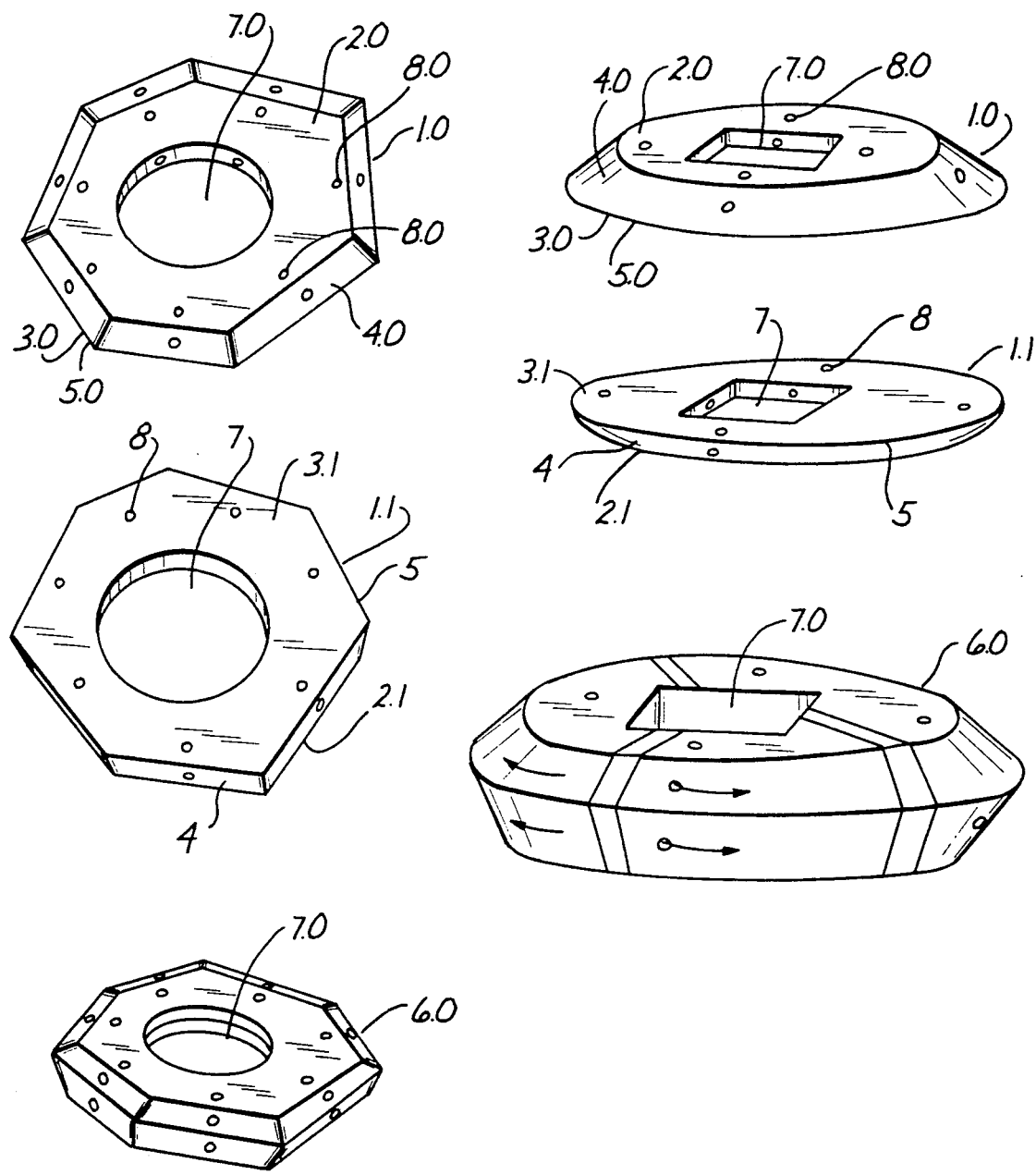
FIG. 18 shows a perspective view depicting four frustums, two seven sided and two infinite sided and two modules made from the said frustums.

This description will be done in connection to FIG. 18 as follows: 1.1 having each frustum two opposite bases 2.0, 3.0, 2.1, 3.1, one larger 3.0, 3.1 than the other 2.0, 2.1 (each base may have from three to infinite edges), one peripheral faceted side 4.0 (with as many facets as the bases 2.0, 3.0, 2.1, 3.1, has edges) between the bases, and on critical perimetrical side 4.0; being one frustum's larger base 3.0 congruent to the other frustum's larger base 3.1:

a) The making of holes 7 through the said frustums' bases 2.0, 2.1, 3.0, 3.1 in order to allow access to the structure, connect one module to another and eventually connect one frustum to another making skeletal frustums.

b) the making of holes 8 through the said frustums' peripheral sides 4.0 in order to connect one module t another.

c) The congruent union of the said 1.0, 1.1, frustums' bases by their said larger congruent bases 3.0, 3.1 forming a module 6.0.

Figure 19:
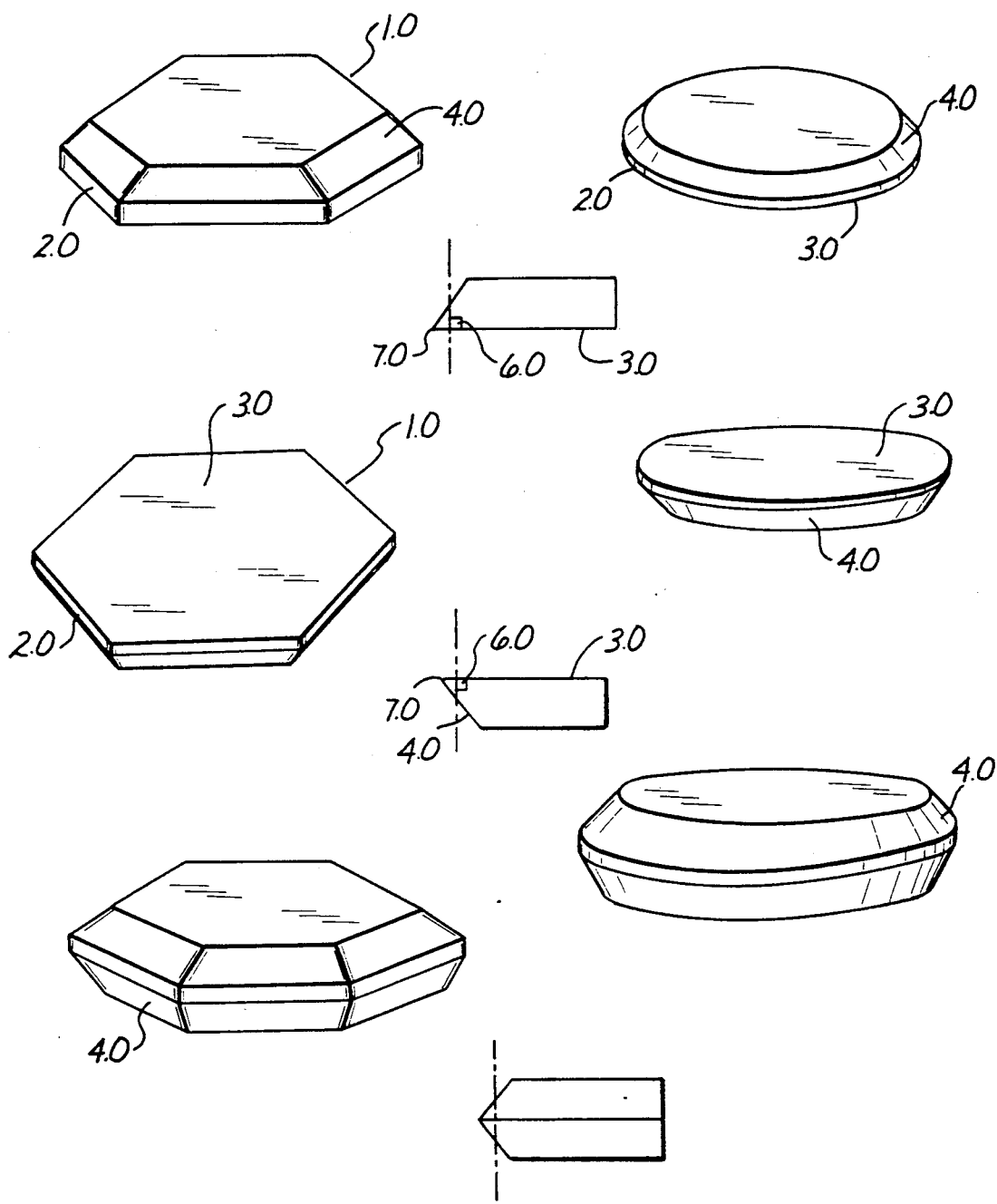
FIG. 19 shows a perspective view depicting four truncated frustums, two modules made with the said frustums and three cross sections depicting the rounding.
Figure 20:
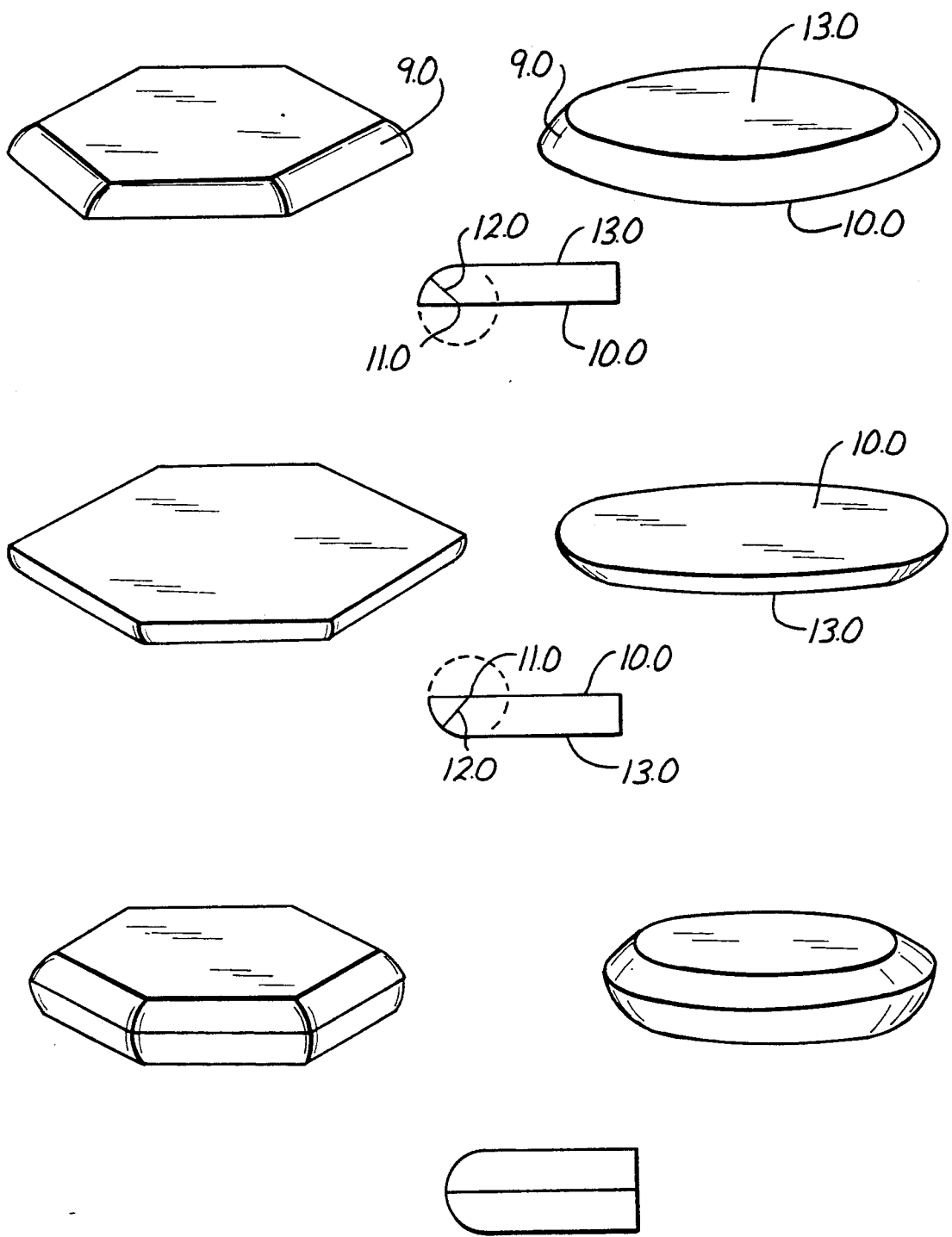
FIG. 20 shows a perspective view depicting four rounded frustums, two modules made with the said frustums; and three cross sections depicting the rounding.

The method further comprises two additional steps described in connection t FIGS. 19 and 20 respectively:

d) The truncation of the said frustums 1.0 critical peripheral edge 7.0 through planes perpendicular 6.0 to the larger base 3.0 creating a new faceted side 2.0 between the peripheral side 4.0 and the larger base 3.0 e) The convex circular rounding of the said frustums' peripheral side 9.0 in such a manner that part of the cross section of the frustum shows a quarter of a circle defining the rounding.

The center 11.0 of that hypothetical circle is on the large base 10.0 and the length of its radius 12.0 is equal t the distance between the frustum's bases 13.0, 10.0.

ASSEMBLING OF MODULES

Figure 8:
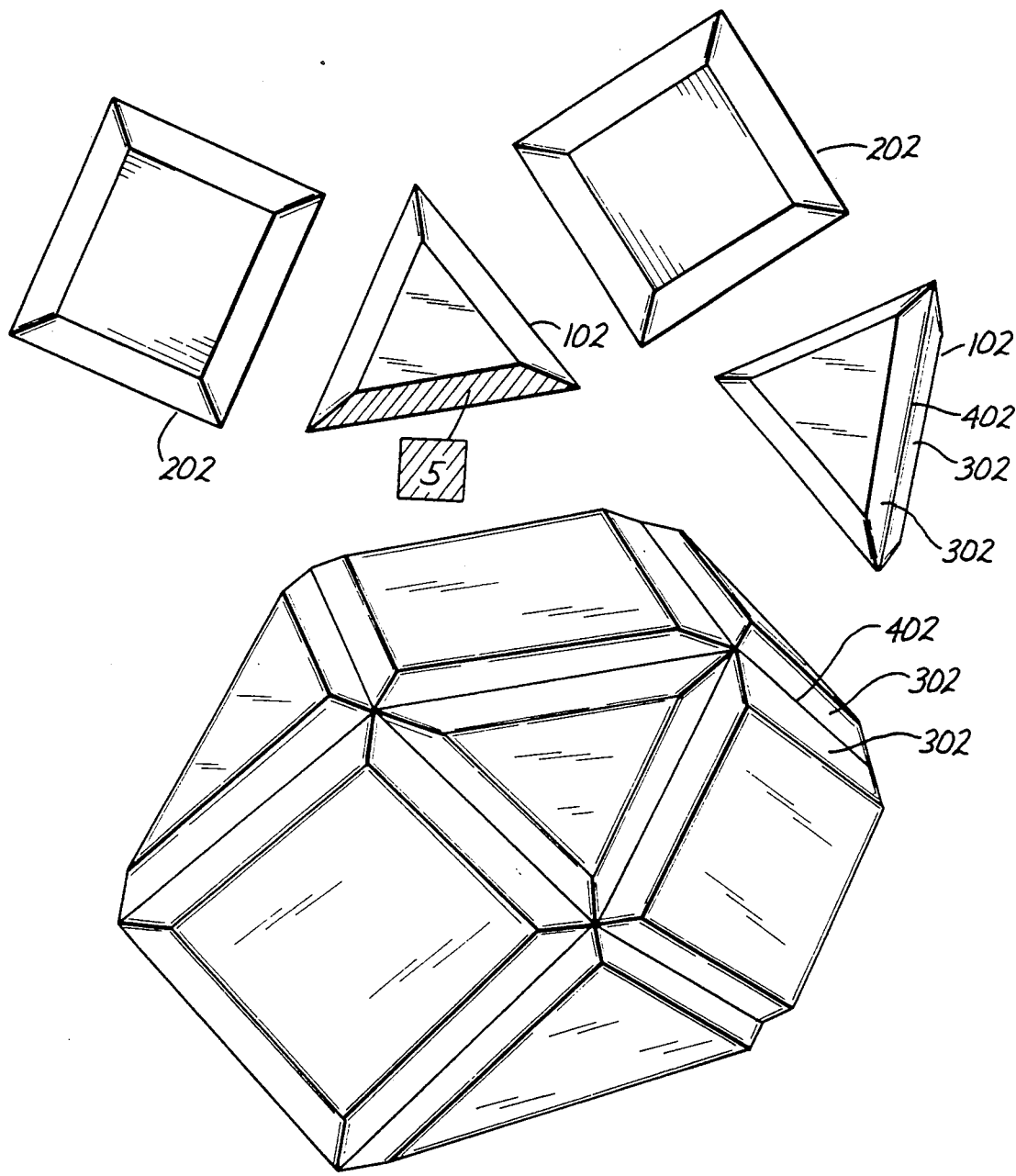
FIG. 8 shows a perspective view of the cuboctahedron-octahedron structure made by a plurality of pyramidal said modules connected together by their trapezoidal faces.

The assembling or erecting of the modules will be described now in connection to FIGS. 8 and 9. To erect the module into a building structure is to reverse the process of its construction, a process in which the volume looses an interior portion and it is divided into as many units, or pyramids, as the polyhedron has faces. The pyrmidal module has two peripheral sides 3.00 divided into as many trapezoids 502 as the plane section of he module has sides. Fro the modules to be assemble, erected into polyhedral structures, its trapezoids 502 must be congruent bonded—attached t other module trapezoids.

Figure 9:
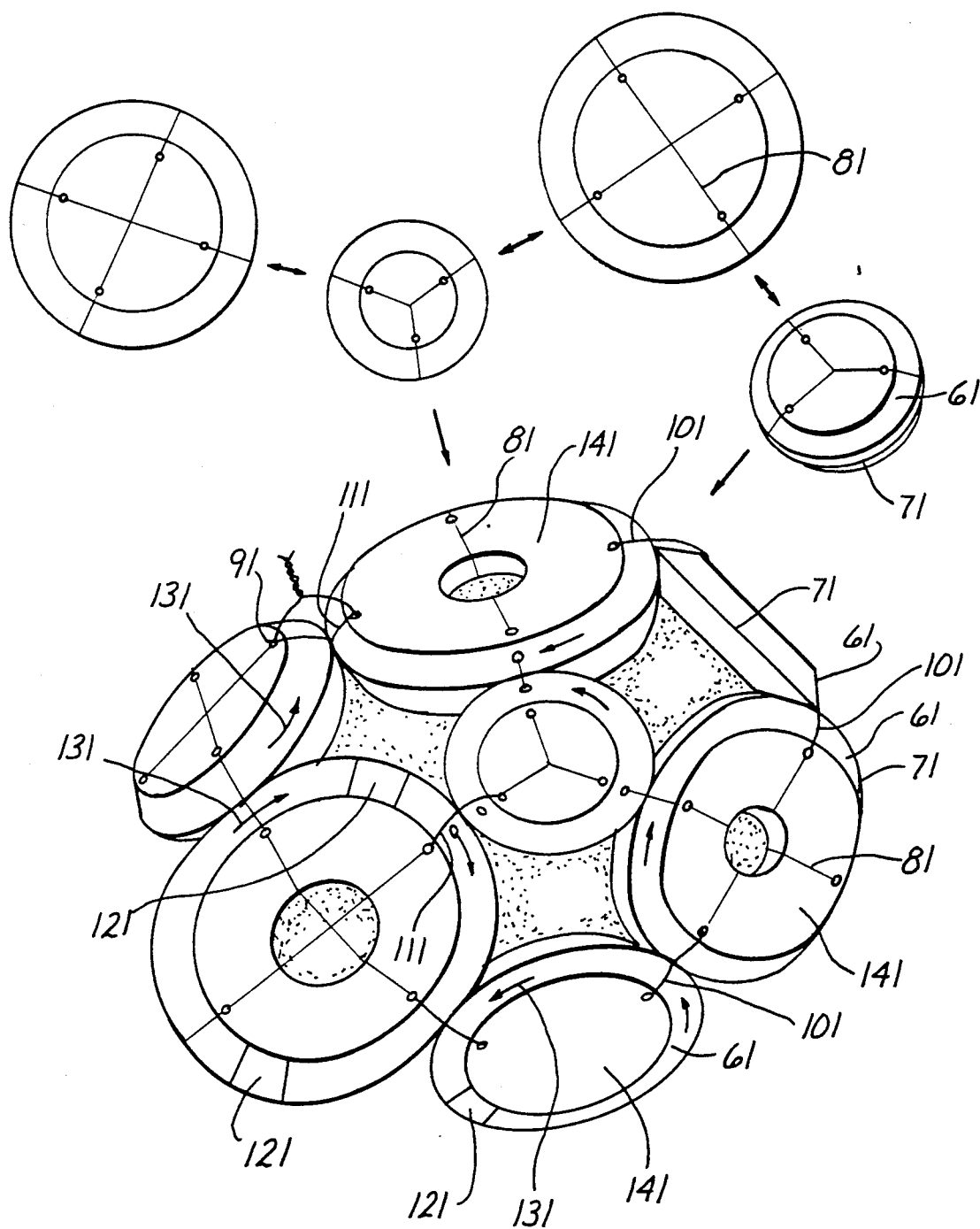
FIG. 9 shows a perspective view of the cuboctahedron-octahedron steructure made by polarized conical solid modules connected together their marks.

The conical module in FIG. 9 has two perimetrical sides 6 divided by a peripheral edge 7—the module is marked 8 radially or/and holed 9 to show the lines 10 on the perimetrical edge that must be shared by the modules to be assembled, erected, into polyhedral structures. The conical modules may be held together by means of a wire-like fastener 111 or may be held magnetically 131. These magmatic ring modules may be provided by one or more insulators 121. FIG. 9 shows a type of structure, cuboctahedron-octahedron system that may be assembled with magnetically polarized 131 modules without insulators 121, the modules must be circularly magnetized 131 (perpendicular to the bases 141).

BUILT-IN DIHEDRAL SLOT CONNECTORS

Until this point, the present invention module sides are connected parallel to each other by means of a fastener intersecting them at ninety degrees. This new module will intersect others at ninety degrees, as depicted in the schematic perspective view of FIG. 13.

Another reason why we've selected the five structure systems depicted in FIGS. 1 to 5 will become apparent. The five systems interact making what we may call three super-systems.

Figure 13:
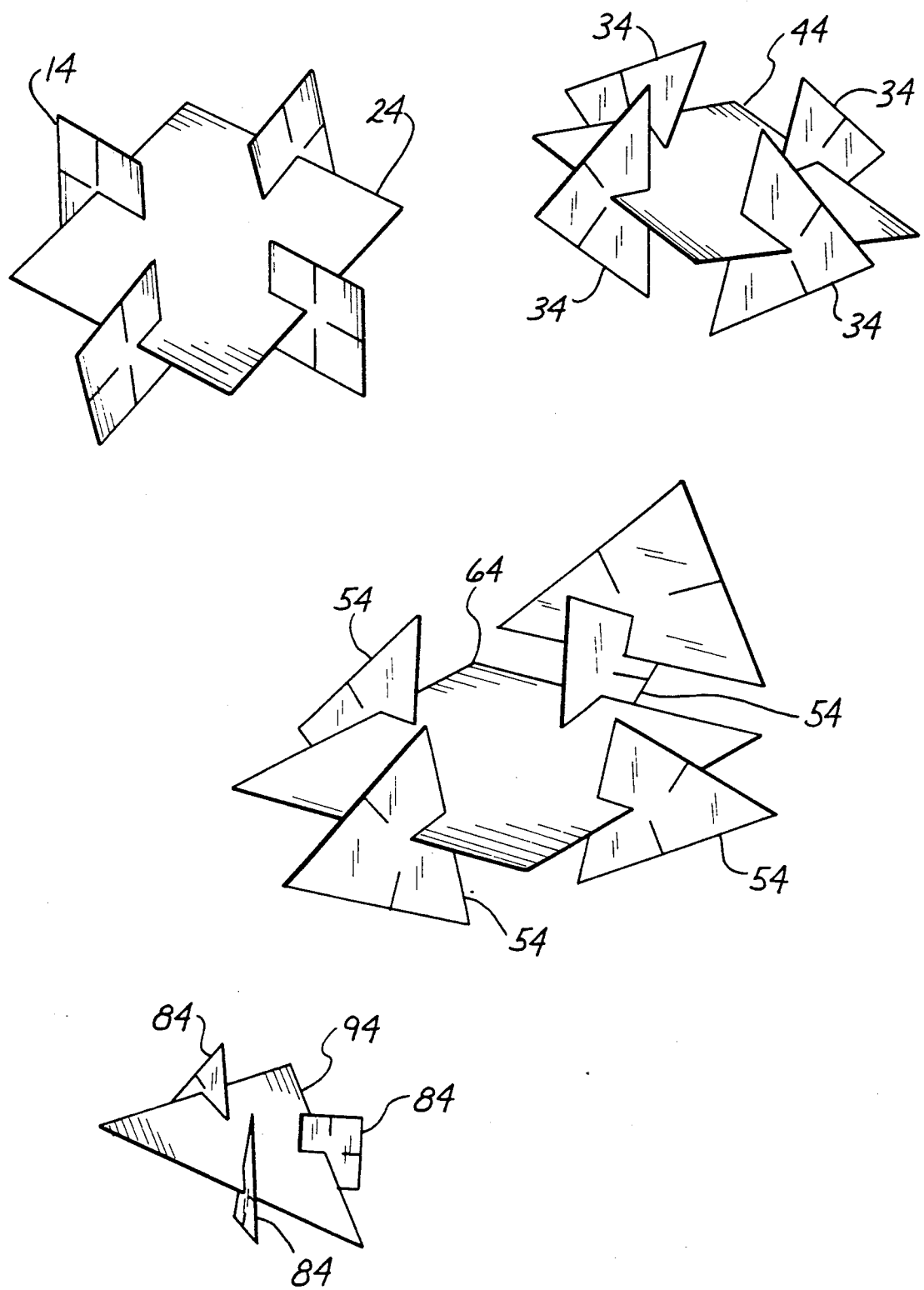
FIG. 13 shows a perspective view depicting five-type-modules slot connected to five-type modules.
Figure 14:
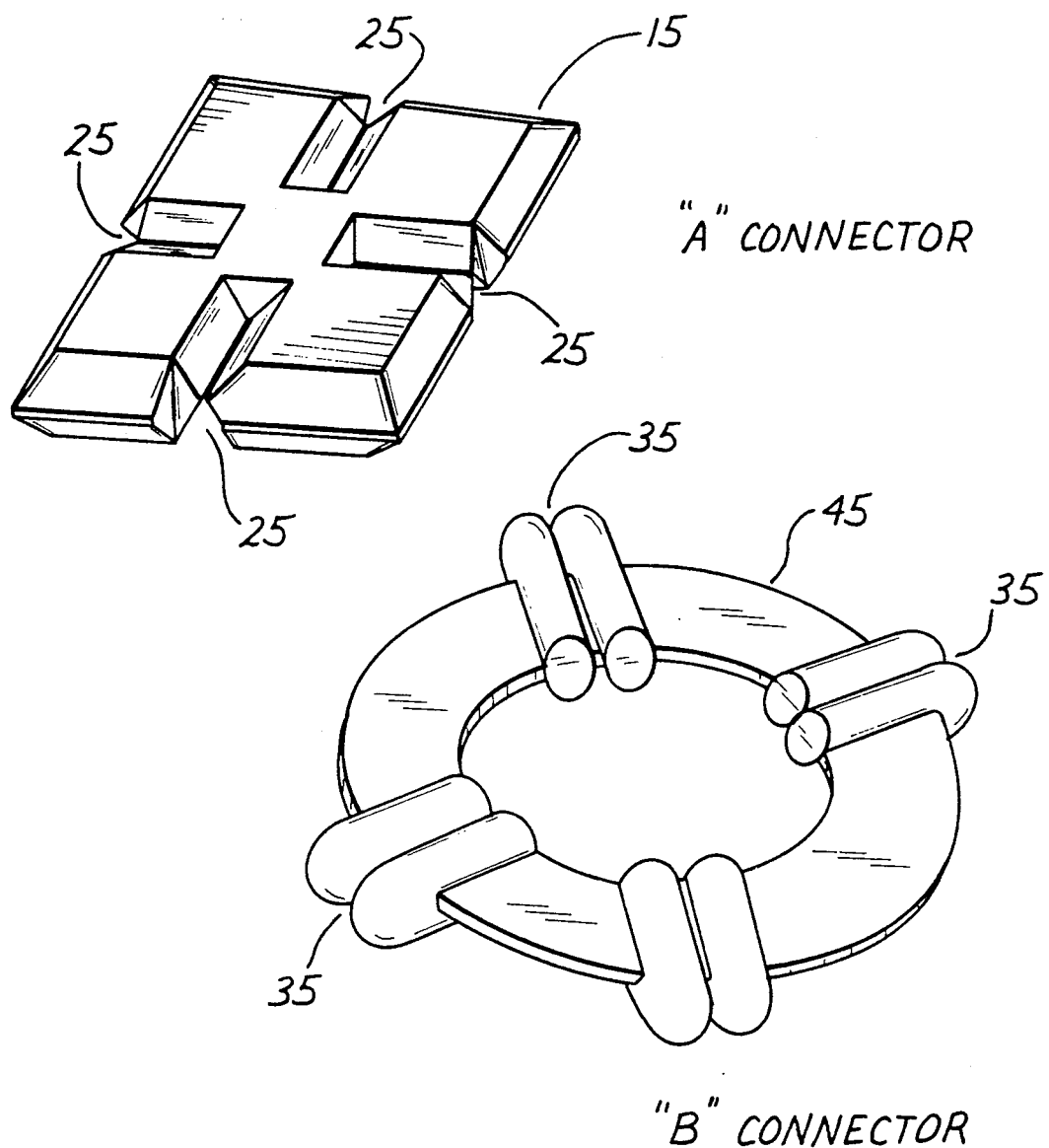
FIG. 14 shows a perspective view depicting two modules, one pyramidal with and "A" connector and one conical with a "B" connector.
Figure 15:
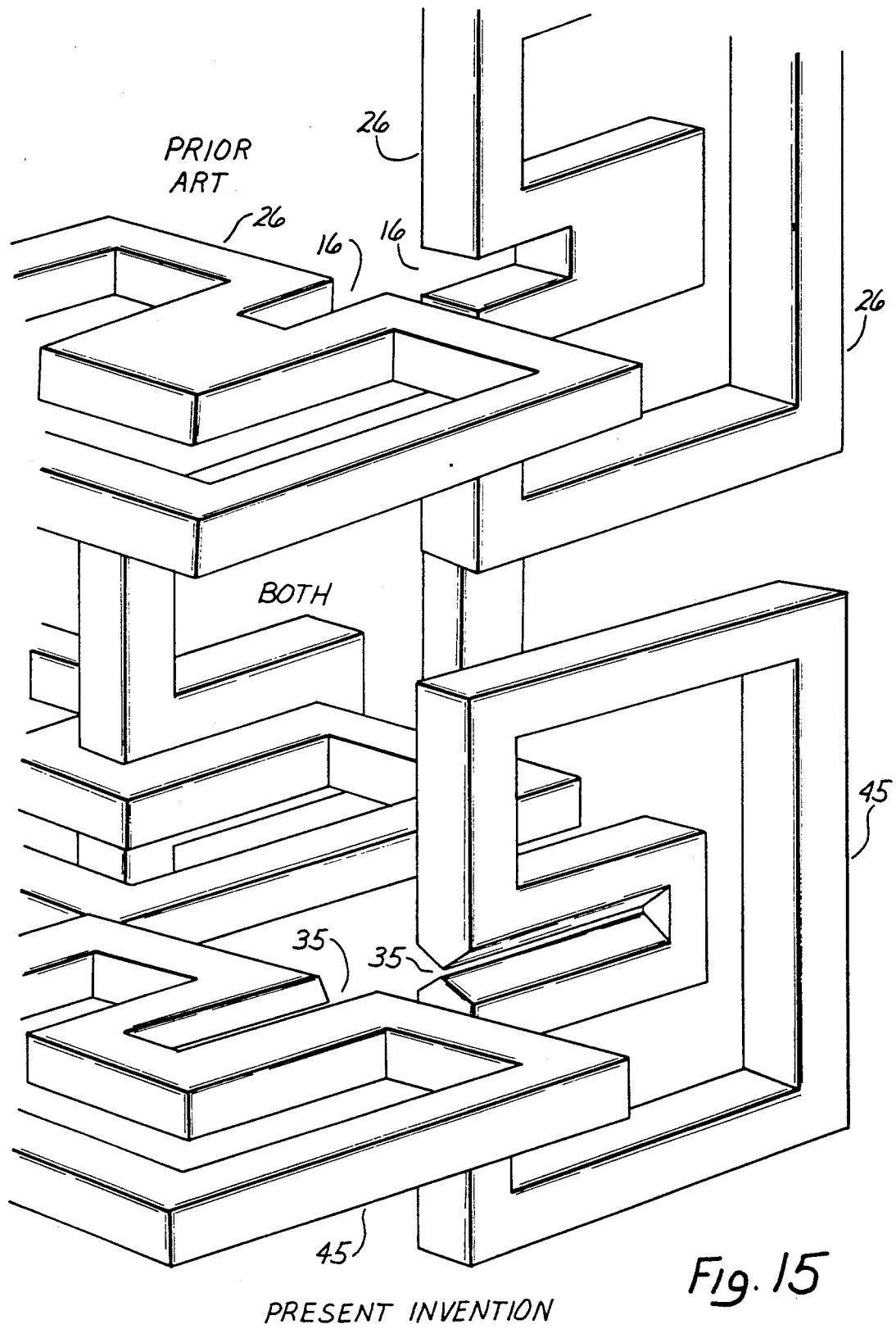
FIG. 15 shows a perspective view depicting prior art and present invention built-in slot connectors.

In reference to FIG. 13, the cube-system 24 intersecting connector 14 is a smaller cube module. The rhombic dodecahedron system 44 intersecting connector is a small era regular tetrahedron module 34. The cuboctahedron-octahedron system 64 intersecting connector is a smaller tetragonal octrahedron module 54. And the tetragonal octahedron system 94 intersecting connectors are of two kind: the cubotahedron-octrahedron-square module 74 and the cuoctahedron-octahedron-triangle module 84. For the purpose of a ninety degree intersecting connection, the present invention has two preferred embodiments, they are depicted in a perspective view in FIG. 14. One more suited for the pyramidal module with "A" cross section 15, we'll call it "A" connector 25. The other, of a round configuration, more apt for the conical module 45 (here, in simplified cross section) we'll call "B" connector 35. They are depicted in comparison with prior art in FIG. 15. It may be said that prior art slot connectors are a built-in connector for perpendicularly connecting two relatively flat members 26 of equal thickness; also the rules for the openings size apply.

Figure 16:
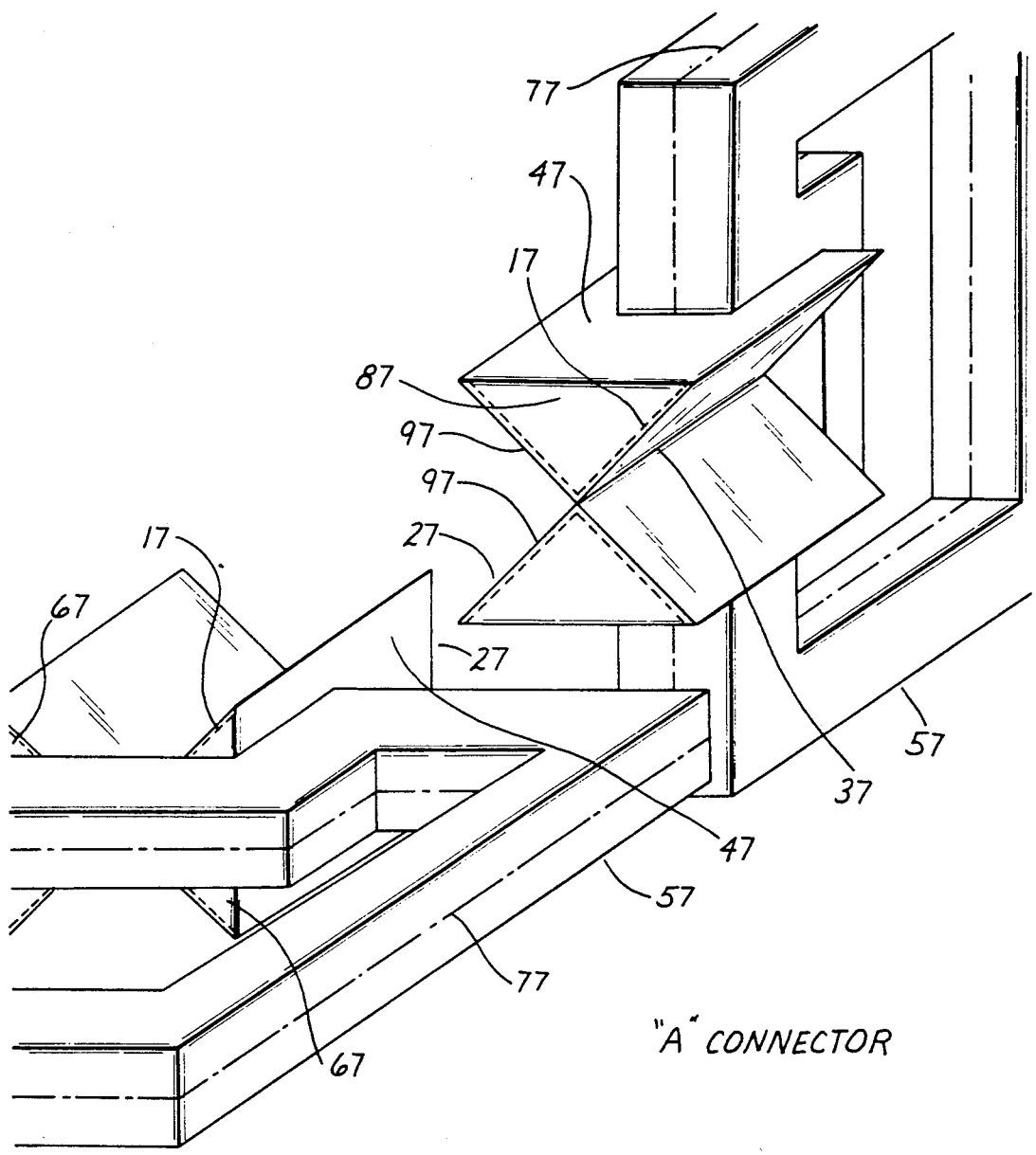
FIG. 16 shows a perspective view depicting two "A" integral slot connectors.

The "A" type will be described in relation to FIG. 16. It is a built-in connector for connecting two undeformable rigid flat members 57. The connector comprises a shape 17 slightly smaller than two rectangular prisms 27 spatially oriented to share their longitudinal right angle edges 37 (ultimately, because the actual prisms are smaller than the described prisms, and there is a gap between prisms 27 instead of touching).

The prisms have their larger faces 47 mutually parallel, the member 57 attached to said larger aces 47 and to two coplanar prisms' triangular faces 67; the said prisms' common edge 37 is a lien in the middle plane 77 section of the member 57. To accomplish a smoother connection and avoid chipping, the front end faces' 87 shorter edges 97 and the right angle edge 37 should be obviously rounded or truncated.

Figure 17:
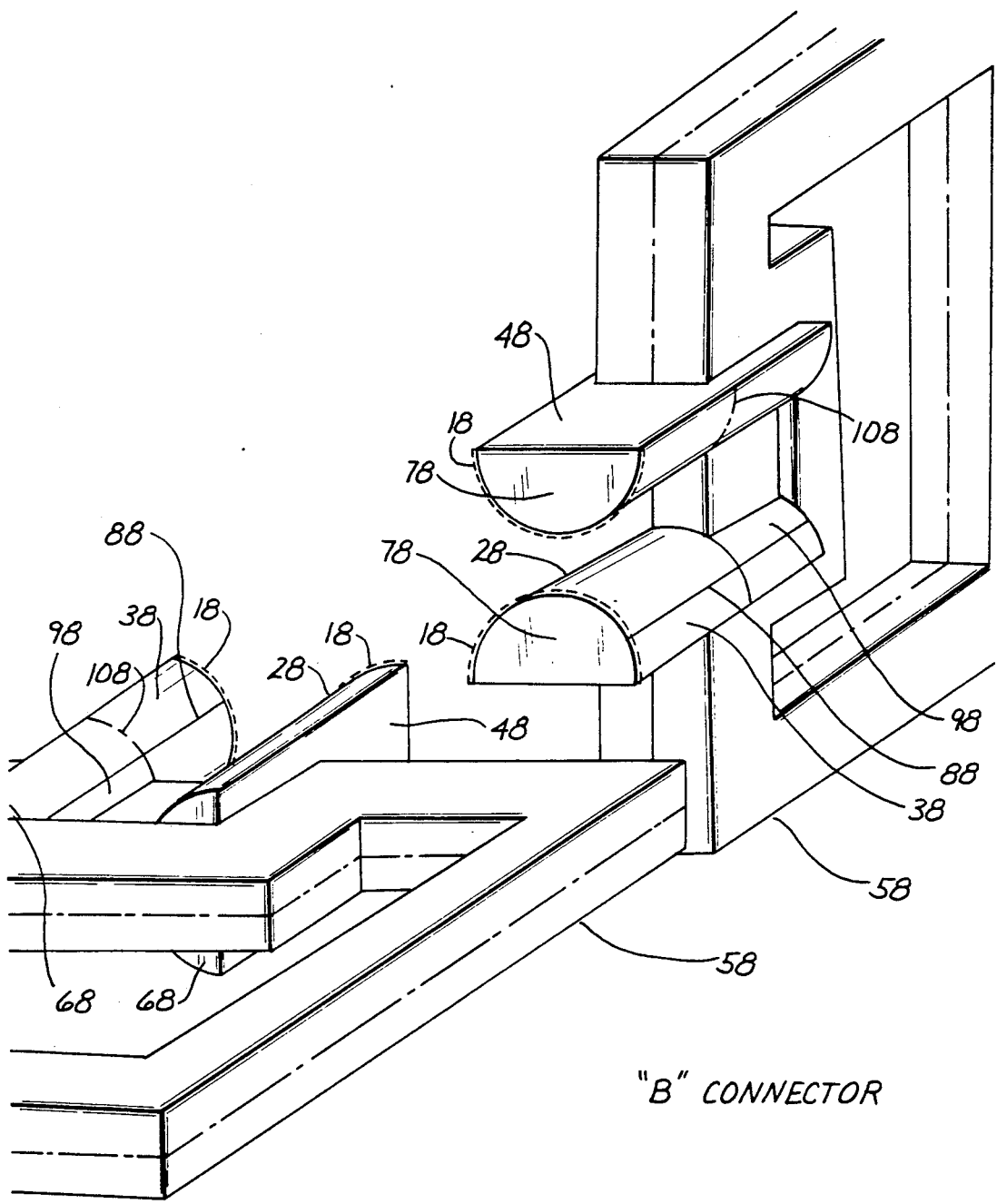
FIG. 17 shows a perspective view depicting two "B" integral slot connectors.

The advantage of the "A" connector over the prior art is its minimization of the weakening of the member and the enlarging the surface of contact. Because the right angle edge 37 results in the "B" connector when rounded up to semicircle, the following description in reference to FIG. 17 is intended as further clarification. The "B" connector is a built-in connector for connecting two deformable rigid flat members 58. It comprises a shape 18 slightly larger than two semicircular prisms 28 spatially oriented to mutually face their curved faces 38 having their flat rectangular faces 48 mutually parallel at a distance equal to the diameter of the prisms' semicircle multiplied by the square root of two (because ultimately the prisms are larger than described here, the distance between rectangular faces is smaller). The member 58 is attached to the said prisms' rectangular faces 48 and to two coplanar semicircular faces 68. For the purpose of a smoother connection, the semicircular front end faces' 78 curved edges 18 should be rounded or truncated.

In building block scale modeling, the problem of inexpensive locking, gripping or snap action is very important. The present invention "B" connector solution gives a large margin of manufacture tolerance.

The contact liens 88 between connectors are radius of a semicylinder. Cylinders, when pushed in a surface line parallel to its cross section center, deform easily, which is what the designed looks for in a slow-wear holding system.

The "B" connector is now ready to interconnect with the "A" connector; if it is not in our interest to unite the systems, the "B" connector will improve in strength by means of a bridge 98 between the closer points of the prisms' curved faces 38 from the longitudinal middle 108 toward the member, the bridge being never thicker than the gap between prisms. The design concepts of the "B" connector is presented without scale considerations, mainly, but not limited to use with the present invention. It is in the hands of the designers to complete them with proprietary specification in a variety of markets. It is expected that our method will combine with new specific inventions in a wide range of industries and markets.

The present invention encourages the construction of hollow modules, such as inflated units made out of two equal flexible sheets welded in such perimeters that, when inflated, they resemble conical cross section "B" skeletal with "B" connectors modules. For advanced constructive applications, the designer may look for known data published in Coxeter's "Regular Polytopes", Buckminster Fuller's "Synergetics", Arthur Loeb's "Space Structures" and the above mentioned book of Pearce. In a less advanced stage, the designer may use school texts or our basic examples. For amusing (puzzle) applications, the designer may use proprietary data or a system for creating such a data.

What we claim is:

1. A plurality of modular construction blocks extending in three dimensions from a combination of which blocks a three dimensional completely and substantially space-filling structure of arbitrary shape and volume is provided, each said block comprising a plurality of surfaces:
   wherein each said block is generally flat;
   wherein each said block is characterized by a flat face said flat face having a geometric shape determined by a face of a polyhedron selected from a group of space-filling polyhedrons, which when appropriately combined, substantially and completely fill said arbitrary volume of space;
   wherein generally transverse to said flat face of each block is a plurality of peripheral sides extending said block in a dimension perpendicular to said flat face of said block, each one of said peripheral sides determined by a surface defined within said selected polyhedron by a point within said selected polyhedron and at least two surface points of said selected polyhedron, said peripheral side being a truncated portion of said surface within said selected polyhedron, so that said three-dimensional space-filling structure may be provided by assembling a plurality of said modular blocks, connected together along their peripheral sides with the result that the amount of material necessary to provide said three-dimensional space-filling structure is reduced.

2. The plurality of modular construction blocks of claim 1 wherein said selected polyhedron is a tetrahedron.

3. The plurality of modular construction blocks of claim 1 wherein each said block is comprised of a first and second portion, said first portion being defined as that portion of said block on a first side of said flat face and said second portion being defined as that portion of said block on an opposing second side of said flat face, said first portion defined from a first selected polyhedron of said plurality of space-filling polyhedrons and said second portion defined from a second different type of polyhedron of said plurality of space-filling polyhedrons.

4. The plurality of modular construction blocks of claim 1 wherein said face of said selected polyhedron is treated as having an infinite number of vertices arranged in a circle on said face, said circle being tangent to each side of said face, and wherein said dihedral sectional plane within said polyhedron defining said peripheral sides being a conic surface.

5. The plurality of modular construction blocks of claim 4 wherein said selected polyhedron is selected from the group of polyhedrons consisting of a cube, tetrahedron, tetragonal octahedron, rhombic dodecahedron, regular octahedron and combinations thereof.

6. The plurality of modular construction blocks of claim 1 wherein a substantial portion of the interior of each said block is hollow, said peripheral sides forming a contiguous skeletal structure.

7. The plurality of modular construction blocks of claim 1 further comprising means for connecting each said construction block to a plurality of other ones of said construction blocks along said peripheral sides of said construction blocks.

8. The plurality of modular construction blocks of claim 7 wherein said means for connecting is a pair of symmetrical and opposing prisms generally extending perpendicular to one of said peripheral sides of each said block and attached to said corresponding side of said block.

9. The plurality of modular construction blocks of claim 8 wherein said pair of prisms is a pair of opposing triangular prisms having their corresponding apical edge opposed and generally aligned to form a slot connector.

10. The plurality of modular construction blocks of claim 8 wherein said pair of prisms is a pair of opposing half cylinders, said half cylinders having a half cylindrical surface, said half cylindrical surfaces being opposed and symmetrically aligned with each other to form a slot connector.

11. A plurality of modular construction blocks for use in constructing a completely and substantially three dimensional space-filling structure of arbitrary shape, each said block comprising a plurality of exterior surfaces;
  wherein said surfaces include a flat face generally parallel to and coextensive with a planar face of a selected space-filling imaginary polyhedron; and
  wherein said surfaces include peripheral sides of said block, said peripheral sides arranged and configured to connect with corresponding peripheral sides of another one of said modular blocks similarly corresponding to an adjacent face of said selected imaginary polyhedron, said modular block being connected to adjacent modular blocks along said peripheral sides.

12. The plurality of modular construction blocks of claim 11 wherein said selected imaginary polyhedron is selected from the group of polyhedrons consisting of a cube, tetrahedron, tetragonal tetrahedron, rhombic dodecahedron, regular octahedron, cuboctrahedron and combinations thereof.

13. The plurality of modular construction blocks of claim 11 wherein each block is provided with an infinite number of said peripheral sides so that said peripheral sides comprises a generally circular cross section in the plane of said planar extension of said modular block.

14. The plurality of construction blocks of claim 11 further comprising fastening means for connecting said blocks to each other and wherein each block is connected to other ones of said blocks by said fastening means only at points on said peripheral sides of said blocks and not at apexes of said blocks.

15. The plurality of construction blocks of claim 14 where said fastening means comprises:
  a triangular, flat, connector having three connecting points; and
  a square, flat, connector having four connecting points,
  wherein said plurality of construction blocks are fastened together only at their peripheral sides with the use of only selected ones of said triangular and square flat connectors to form said arbitrarily shaped three dimensional space-filling structure.

* * * * *